(12) United States Patent
Li et al.

(10) Patent No.: US 12,539,461 B2
(45) Date of Patent: Feb. 3, 2026

(54) DATA TRANSMISSION METHOD AND APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Guozhu Li, Shenzhen (CN); Yu Liang, Shenzhen (CN); Wentao Zhong, Shenzhen (CN); Jinlin Liu, Shenzhen (CN); Lang Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 349 days.

(21) Appl. No.: 18/139,355

(22) Filed: Apr. 26, 2023

(65) Prior Publication Data

US 2023/0264101 A1    Aug. 24, 2023

Related U.S. Application Data

(63) Continuation of application No. PCT/CN2022/094916, filed on May 25, 2022.

(30) Foreign Application Priority Data

Jun. 3, 2021  (CN) .......................... 202110620279.3
Dec. 27, 2021  (CN) ........................... 202111611884.0

(51) Int. Cl.
 *A63F 13/358*  (2014.01)
 *A63F 13/332*  (2014.01)

(52) U.S. Cl.
 CPC .......... *A63F 13/358* (2014.09); *A63F 13/332* (2014.09)

(58) Field of Classification Search
 CPC ...... A63F 13/358; A63F 13/332; A63F 13/35; A63F 13/77; H04L 12/46; H04L 67/131
 (Continued)

(56) References Cited

U.S. PATENT DOCUMENTS 11,449,347 B1 *   9/2022  Kong ..................... G06F 16/285
2003/0233221 A1 * 12/2003  O'Brien ............... G06F 11/3698
                                                      703/23

(Continued)

FOREIGN PATENT DOCUMENTS

CA    2646414-01  * 10/2007  ............. H04L 69/10
CA    2646414-02  * 10/2007  ............. H04L 69/10

(Continued)

OTHER PUBLICATIONS

The World Intellectual Property Organization (WIPO) International Search Report for PCT/CN2022/094916 Aug. 2, 2022 12 Pages (including translation).

(Continued)

*Primary Examiner* — Michael A Cuff
(74) *Attorney, Agent, or Firm* — Anova Law Group, PLLC

(57) ABSTRACT

A data transmission method includes: displaying, in an acceleration function interface of a first application, a second application to be accelerated, the first application configured to reduce a network latency between the second application and a corresponding target server, and the second application configured to provide a virtual scene; determining a target transmission link based on a network latency of a mobile communication link and a network latency of a wireless communication link in response to a trigger operation on the second application, the target transmission link including at least one of the mobile communication link or the wireless communication link; and performing data transmission with (Continued)

the target server corresponding to the second application based on the target transmission link.

20 Claims, 18 Drawing Sheets

(58) Field of Classification Search
 USPC .......................................................... 463/42
 See application file for complete search history.

(56) References Cited

U.S. PATENT DOCUMENTS

| | | | | |
|---|---|---|---|---|
| 2004/0215746 | A1* | 10/2004 | McCanne | ............... H04L 67/56 |
| | | | | 709/219 |
| 2008/0320151 | A1* | 12/2008 | McCanne | ............... H03M 7/30 |
| | | | | 709/228 |
| 2014/0312566 | A1 | 10/2014 | Rubin et al. | |
| 2016/0014437 | A1* | 1/2016 | Perlman | ................ A63F 13/358 |
| | | | | 463/31 |
| 2020/0238175 | A1* | 7/2020 | Smullen | .................. A63F 13/52 |

FOREIGN PATENT DOCUMENTS

| | | | | |
|---|---|---|---|---|
| CA | 2646414-03 | * | 10/2007 | ............. H04L 69/10 |
| CN | 103957208 | A | 7/2014 | |
| CN | 110247824 | A | 9/2019 | |
| CN | 110535745 | A | 12/2019 | |
| CN | 110601921 | A | 12/2019 | |
| CN | 111211980 | A | 5/2020 | |
| CN | 112221121 | A | 1/2021 | |
| WO | 2018183789 | A1 | 10/2018 | |

OTHER PUBLICATIONS

China National Intellectual Property Administration (CNIPA) Office Action 1 for Application No. 202111611884.0 Mar. 28, 2025 8 Pages (including translation).

* cited by examiner

DATA TRANSMISSION METHOD AND APPARATUS, ELECTRONIC DEVICE, AND STORAGE MEDIUM

CROSS-REFERENCES TO RELATED APPLICATIONS

This application is a continuation application of PCT Patent Application No. PCT/CN2022/094916, entitled "DATA TRANSMISSION METHOD AND APPARATUS, AND ELECTRONIC DEVICE AND STORAGE MEDIUM" and filed on May 25, 2022, which claims priority to Chinese Patent Application No. 202110620279.3, entitled "DATA TRANSMISSION METHOD AND APPARATUS, ELECTRONIC DEVICE, AND STORAGE MEDIUM", filed on Jun. 3, 2021 and Chinese Patent Application No. 202111611884.0, entitled "DATA TRANSMISSION METHOD AND APPARATUS, ELECTRONIC DEVICE, AND STORAGE MEDIUM", filed on Dec. 27, 2021, the entire contents of both of which are incorporated herein by reference.

FIELD OF THE TECHNOLOGY

The present disclosure relates to the field of computer technologies, and in particular, to a data transmission method and apparatus, an electronic device, and a storage medium.

BACKGROUND OF THE DISCLOSURE

With the development of computer and communication technologies, mobile games are increasingly popular among gamers. Along with the development trend of game mobility, a network frame freezing problem that occurs frequently during games has caused annoyance to the gamers. More gamers are tending to use a game accelerator for network acceleration to improve smoothness of game running.

SUMMARY

Embodiments of the present disclosure provide a data transmission method and apparatus, an electronic device, and a storage medium, which can improve data transmission efficiency and effectively perform network acceleration. The technical solutions are as follows:

According to one aspect, a data transmission method is provided, performed by an electronic device, the method including: displaying, in an acceleration function interface of a first application, a second application to be accelerated, the first application configured to reduce a network latency between the second application and a corresponding target server, and the second application configured to provide a virtual scene; determining a target transmission link based on a network latency of a mobile communication link and a network latency of a wireless communication link in response to a trigger operation on the second application, the target transmission link including at least one of the mobile communication link or the wireless communication link; and performing data transmission with the target server corresponding to the second application based on the target transmission link.

According to one aspect, a data transmission apparatus is provided, the apparatus including: a display module, configured to display, in an acceleration function interface of a first application, a second application to be accelerated, the first application configured to reduce a network latency between the second application and a corresponding target server, and the second application configured to provide a virtual scene; a first determining module, configured to determine a target transmission link based on a network latency of a mobile communication link and a network latency of a wireless communication link in response to a trigger operation on the second application, the target transmission link including at least one of the mobile communication link or the wireless communication link; and a transmission module, configured to perform data transmission with the target server corresponding to the second application based on the target transmission link.

According to one aspect, an electronic device is provided, the electronic device including one or more processors and one or more memories, the one or more memories storing at least one computer program, and the computer program being loaded and executed by the one or more processors to implement the data transmission method described above.

According to one aspect, a non-transitory storage medium is provided, the storage medium storing at least one computer program, and the at least one computer program being loaded and executed by a processor to implement the data transmission method described above.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art can still derive other drawings from these accompanying drawings without creative efforts.

DESCRIPTION OF EMBODIMENTS

Figure 1:
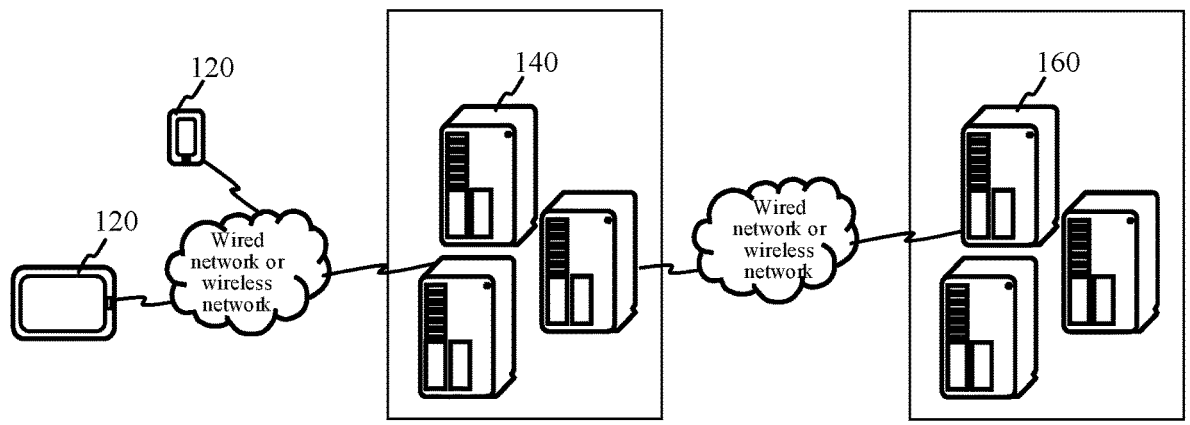
FIG. 1 is a schematic diagram of an implementation environment of a data transmission method according to an embodiment of the present disclosure.

To make the objectives, technical solutions, and advantages of the present disclosure clearer, the following further describes implementations of the present disclosure in detail with reference to the accompanying drawings.

The terms "first", "second", and the like in the present disclosure are used for distinguishing between same items or similar items of which effects and functions are basically the same. It is to be understood that, the "first", "second", and "nth" do not have a dependency relationship in logic or time sequence, and a quantity and an execution order thereof are not limited.

In the present disclosure, the term "at least one" means one or more, and "a plurality of" means two or more. For example, a plurality of positions means two or more first positions.

In the related technology, a gamer needs to install a game accelerator on a terminal, and selects a game application to be accelerated in an acceleration function. However, only one acceleration animation is played during acceleration by a game accelerator usually, and then applications other than the game application are suspended (or other applications are caused to sleep), to save communication resources of the terminal, so that more communication resources can be provided for the game application. However, in a case of a weak network, the reason for network frame freezing is a relatively high network latency of a communication link, and an effective acceleration effect actually cannot be achieved only by saving communication resources of a terminal. Therefore, there is an urgent need for a method that can improve data transmission efficiency for effective network acceleration.

Terms involved in the embodiments of the present disclosure are explained below.

Virtual scene: A virtual scene is displayed (or provided) during running of an application on a terminal. The virtual scene may be a simulated environment of a real world, or may be a semi-simulated semi-fictional virtual environment, or may be an entirely fictional virtual environment. The virtual scene may be any one of a two-dimensional virtual scene, a 2.5-dimensional virtual scene, or a three-dimensional virtual scene, and the dimension of the virtual scene is not limited in the embodiments of the present disclosure.

Dual-channel acceleration: Dual-channel acceleration is an acceleration solution that enables stable and low-latency end-to-cloud transmission. "Dual channels" include a wireless communication link and a mobile communication link. The wireless communication link usually refers to a wireless fidelity (Wi-Fi) path. The mobile communication link includes a Long Term Evolution (LTE) path, a third generation mobile communication technology (3G) path, a fourth generation mobile communication technology (4G) path, or a fifth generation mobile communication technology (5G). That the wireless communication link is a Wi-Fi path and the mobile communication link is an LTE path is used as an example for description. The dual-channel acceleration is a network acceleration policy of performing selective scheduling or dual-channel redundant transmission on the Wi-Fi/LTE two paths based on the Multipath User Datagram Protocol (MP-UDP) on an end side.

Floating window technology: is a floating layer display technology for a terminal at an operating system layer, and can suspend a movable window on a surface of another application to facilitate opening of different applications. The floating window can carry a dynamic picture, dynamic text, and the like and expose the dynamic picture, dynamic text, and the like for display. In the embodiments of the present disclosure, during running of a second application, that is, a game application, acceleration description information of a first application, that is, an acceleration application, may be displayed in a virtual scene of the second application in a form of a floating window.

Network latency: A network latency refers to time consumed for a data packet to be sent from a terminal of a user to a server, and then immediately returned from the server to the terminal of the user in a round trip. A higher network latency indicates a lower network speed and worse network quality. A lower network latency indicates a higher network speed and better network quality.

Network packet loss: Network packet loss is a phenomenon in which data packets are lost on a channel for various reasons during inquiry of a target station (such as a server) by using a Packet Internet Groper (Ping). Ping is a network diagnosis tool. Reasons for network packet loss mainly include: a physical line failure, a device failure, a virus attack, a routing information error, and the like.

Channel control message: In a network acceleration system based on a dual-channel acceleration policy and involved in the embodiments of the present disclosure, to ensure that a link between a client layer and a cloud server is normal, and that an intelligent decision can be made when a client schedules a channel, the following four control messages are newly designed between the client and the cloud server.

(1) Probing message. A probing message is proactively sent by the first application and used for updating a network latency from the first application to an acceleration server, assisting in channel scheduling decisions. In some embodiments, the probing message is sent only on a Wi-Fi channel.

(2) Acknowledgement (ACK) message. An ACK message is a return packet sent by the acceleration server to the first application on an original target transmission link after the acceleration server receives the probing message, and is used for updating the network latency from the first application to the acceleration server, assisting in channel scheduling decisions.

(3) Notification message. When the first application does not transmit any data to the acceleration server within target duration (for example, three seconds), the first application proactively sends a notification message to the acceleration server. The acceleration server does not need to return a packet after receiving the notification message. When a return packet can be received, it indicates that the channel is in a normal state and data transmission can be continued. Similarly, when the acceleration server does not transmit any data to the first application within target duration (for example, three seconds), the acceleration server proactively sends a notification message to the first application. The first application does not need to return a packet after receiving the notification message. When a return packet can be received, it indicates that the channel is in a normal state and data transmission can be continued. In some scenarios, the acceleration server or the first application does not receive any notification message. In this case, the acceleration server or the first application tries reconnection. If the reconnection fails, it is considered that a target transmission link with the other party is disabled, and corresponding communication resources are released. The target duration may be any value greater than 0. In the embodiments of the present disclosure, that the target duration is three seconds is used only as an example for description. The target duration may alternatively be five seconds, ten seconds, or the like, which may be customized by a technical person.

(4) Channel close message. A channel close message is proactively sent by the first application and used for disabling the target transmission link to release communication resources occupied by both a terminal and a server. The first application sends the channel close message before disabling the target transmission link, and releases communication resources occupied by the first application. The acceleration server also immediately releases occupied communication resources after receiving the channel close message, to ensure channel performance.

Channel data scheduling mode: The embodiments of the present disclosure relate to three scheduling modes: a redundant transmission mode (Wi-Fi+LTE), a primary path (Wi-Fi) transmission mode, and a secondary path (LTE) transmission mode.

FIG. 1 is a schematic diagram of an implementation environment of a data transmission method according to an embodiment of the present disclosure. Referring to FIG. 1, the implementation environment includes a terminal 120, an acceleration server 140, and a target server 160.

A first application and a second application are installed on the terminal 120. The first application is used for providing a network acceleration (or game acceleration) service to the second application. The second application is used for providing a virtual scene capable of interaction. The first application is also referred to as an acceleration application. For example, the first application may be a game acceleration application, a network acceleration application, a mobile manager application, a mobile assistant application, a computer manager application, and other applications that can provide a network acceleration service. A type of the first application is not specifically limited in this embodiment of the present disclosure. The second application is also referred to as a game application or any application that supports a virtual scene. The second application may be a multiplayer online battle arena (MOBA) game, a massively multiplayer online role-playing game (MMORPG), a first-person shooter game (FPS), a third-person shooter game, a virtual reality application, a three-dimensional map program, a multiplayer instrument-based survival game, or the like. A type of the second application is not specifically limited in this embodiment of the present disclosure.

The terminal 120 may be directly or indirectly connected to the acceleration server 140 through a mobile communication link or a wireless communication link. Alternatively, the terminal 120 may be directly or indirectly connected to the acceleration server 140 in a wired communication manner. The connection manner is not limited in this embodiment of the present disclosure herein. In some embodiments, the mobile communication link may be a communication link based on LTE, or a communication link based on 3G, 4G, 5G, or the like, which is not specifically limited in this embodiment of the present disclosure. In some embodiments, the wireless communication link may be a communication link based on a Wi-Fi technology, which is not specifically limited in this embodiment of the present disclosure.

The acceleration server 140 is configured to provide a data forwarding service. On the one hand, the acceleration server 140 receives data sent by the terminal 120, and forwards processed data to the target server 160. On the other hand, the acceleration server 140 receives data sent by the target server 160, and forwards processed data to the terminal 120.

The acceleration server 140 and the target server 160 can be directly or indirectly connected in a wired or wireless communication manner, which is not limited in the present disclosure herein.

The target server 160 is configured to provide a backend service to the second application. When the second application is a game application, the target server 160 may also be referred to as a game server. The target server 160 includes at least one of one server, a plurality of servers, a cloud computing platform, and a virtualization center. In some embodiments, during running of the second application, the target server 160 is responsible for primary computing work, and the terminal 120 is responsible for secondary computing work. Alternatively, the target server 160 is responsible for secondary computing work, and the terminal 120 is responsible for primary computing work. Alternatively, the terminal 120 and the target server 160 perform collaborative computing by using a distributed computing architecture between each other.

In some embodiments, the acceleration server 140 or the target server 160 may be an independent physical server, or a server cluster or distributed system composed of a plurality of physical servers, or may be a cloud server that provides cloud services, cloud databases, cloud computing, cloud functions, cloud storage, network services, cloud communication, middleware services, domain name services, security services, content delivery networks (CDNs), big data and artificial intelligence platforms, and other basic cloud computing services.

In some embodiments, the terminal 120 may be a smartphone, a smart handheld, a portable game device, a tablet computer, a notebook computer, a desktop computer, a smart speaker, a smartwatch, or the like, but is not limited thereto.

The terminal 120 may generally refer to one of a plurality of terminals. A person skilled in the art may learn that there may be more or fewer terminals 120. For example, there may be only one terminal, or there may be dozens of or hundreds of or more terminals. The number and the device type of the terminal 120 are not limited in this embodiment of the present disclosure.

Figure 2:
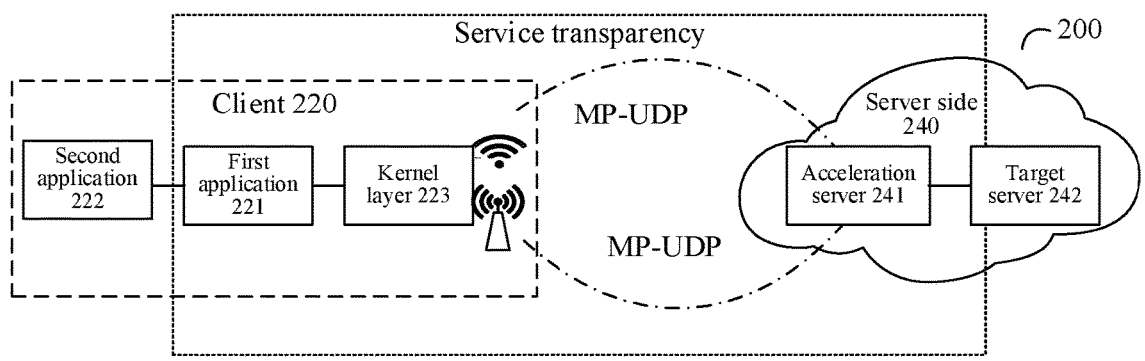
FIG. 2 is a schematic principle diagram of a data transmission system according to an embodiment of the present disclosure.

FIG. 2 is a schematic principle diagram of a data transmission system according to an embodiment of the present disclosure. Referring to FIG. 2, the data transmission system 200 includes a client 220 and a server side 240.

The client 220 includes a first application 221 (client proxy (CP), that is, an acceleration application, or a proxy application), a second application 222 (client application (CA), that is, a game application, or a client application), and a kernel layer 223. The first application 221 is used for providing a game acceleration service to the second application 222. The second application 222 is used for providing a virtual scene, the virtual scene providing an interactive function. The kernel layer 223 is used for providing a dual channel transmission capability, that is, supports redundant data transmission from both a mobile communication link and a wireless communication link.

In some embodiments, interactive data sent by the second application 222 is intercepted by the first application 221. The first application 221 re-encapsulates the intercepted interactive data into a new data packet according to a target transmission protocol (for example, the MP-UDP), and sends the new data packet (for example, an MP-UDP packet) to the server side 240 by using a dual channel transmission capability provided by the kernel layer 223.

The server side 240 includes an acceleration server 241 (server proxy (SP), that is, a service proxy or an acceleration proxy) and a target server 242 (real server, that is, a game server or an application server). On the server side 240, the acceleration server 241 receives, aggregates, and recombines data packets sent by the first application 221, and then sends a finally recombined data packet to the target server 242.

When the target server 242 sends data packets, the acceleration server 241 first intercepts the data packets, and the acceleration server 241 groups the data packets according to a state of the first application 221 and then returns the data packets to the first application 221. The first application 221 aggregates and recombines the received data packets and then returns the aggregated and recombined data packets to the second application 222.

In an exemplary scenario, UDP packets are still transmitted between the second application 222 and the target server 242, and the MP-UDP runs only between the first application 221 and the acceleration server 241. Therefore, service transparency is achieved, and the second application 222 has no perception. In a case of a weak network, the kernel layer 223 can support the dual channel transmission capability. In other words, on the end side, based on the MP-UDP, scheduling on two channels, or paths, of the mobile communication link (for example, an LTE link) and the wireless communication link (for example, a Wi-Fi link) is supported, or dual channel redundant transmission is directly performed, to implement a stable and low-latency acceleration solution for end-cloud transmission, so that problems of network frame freezing and poor user experience caused by a high network latency between the second application 222 and the target server 242 can be alleviated. The Wi-Fi/LTE dual-channel path scheduling or redundant transmission greatly reduces a network latency for data transmission when the network is unstable.

Figure 3:
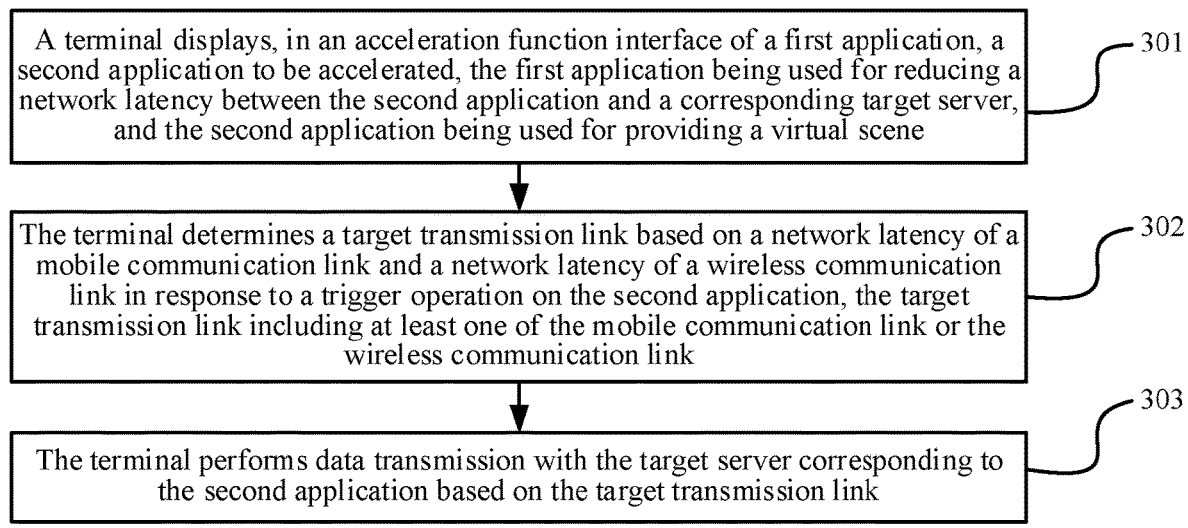
FIG. 3 is a flowchart of a data transmission method according to an embodiment of the present disclosure.

FIG. 3 is a flowchart of a data transmission method according to an embodiment of the present disclosure. Referring to FIG. 3, this embodiment is performed by an electronic device. That the electronic device is a terminal is used as an example for description. This embodiment includes the following steps:

301. The terminal displays, in an acceleration function interface of a first application, a second application to be accelerated, the first application configured to reduce a network latency between the second application and a corresponding target server, and the second application configured to provide a virtual scene.

The terminal may be an electronic device used by a user. For example, the terminal is a smartphone, a smart handheld, a portable game device, a tablet computer, a notebook computer, a desktop computer, a smart speaker, a smartwatch, or the like, but is not limited thereto.

The first application is used for providing a network acceleration (or game acceleration) service to the second application. The first application is also referred to as an acceleration application. For example, the first application may be a game acceleration application, a network acceleration application, a mobile manager application, a mobile assistant application, or a computer manager application. A type of the first application is not specifically limited in this embodiment of the present disclosure.

The second application is used for providing a virtual scene, the virtual scene providing an interactive function. The second application is also referred to as a game application or an application that supports a virtual scene.

In some embodiments, the terminal may display, in the acceleration function interface of the first application, one or more applications to be accelerated, the one or more applications being some or all applications supporting a virtual scene and installed on the terminal. Then, in response to a select operation of the user on any application, the terminal determines the any application selected by the user as the second application to be accelerated this time. In some embodiments, the select operation includes, but is not limited to: a click operation, a touch and hold operation, a double-click operation, a press operation, a slide operation (such as slide left, slide right, slide up, or slide down), a drag operation, a shake operation, a voice command, a gesture command, shortcut key one-key trigger, and the like. A type of the select operation is not specifically limited in this embodiment of the present disclosure.

In some embodiments, when the terminal displays the applications to be accelerated, applications supporting a virtual scene and installed on the terminal may be detected after authorization or full authorization is obtained from the user, and at least one of an application icon, an application name, or an application profile of each application is displayed in the acceleration function interface. In some embodiments, the applications may be arranged in the acceleration function interface in the form of a list, or in a tiled manner, or in a scattered manner, or in the form of tabs.

In an exemplary scenario, the terminal displays, in the acceleration function interface, an acceleration option and one or more tabs of one or more applications to be accelerated. The user may slide left or slide right to or turn pages forward or backward, to view a tab of a previous application or a tab of a next application. At least one of an application icon, an application name, or an application profile may be displayed in the tab of each application. An application currently displayed in the acceleration function interface is the second application. The user can change the currently displayed application through a slide left or slide right operation, to change the second application to be accelerated this time.

In some embodiments, the terminal may enter the acceleration function interface in the following two manners: In the first manner, the terminal displays the acceleration function interface in response to a trigger operation on an acceleration option in a main interface of the first application. In other words, the terminal directly performs a trigger operation on an acceleration option in a main interface of the first application after starting the first application, to enter the acceleration function interface. This can provide a very intuitive human-computer interaction manner. In the second manner, the terminal displays the acceleration function interface in response to a trigger operation on an acceleration option in a message notification bar of the first application. In other words, the terminal does not need to enter a main interface of the first application, and even though the first application is currently suspended at a backend, the terminal can directly jump to the first application and enter the acceleration function interface provided that a trigger operation is performed on an acceleration option in a message notification bar (such as a slide down notification bar) of the first application. This can help the user rapidly switch from any interface to the acceleration function interface of the first application.

302. The terminal determines a target transmission link based on a network latency of a mobile communication link and a network latency of a wireless communication link in response to a trigger operation on the second application, the target transmission link including at least one of the mobile communication link or the wireless communication link.

The mobile communication link refers to a link for connection based on a cellular communication technology. For example, the mobile communication link may be an LTE link, a 3G link, a 4G link, or a 5G link.

The wireless communication link refers to a link for connection based on a Wi-Fi communication technology. For example, the wireless communication link may be a Wi-Fi link.

In some embodiments, during determining of a target transmission link (that is, a transmission link selected for the acceleration), the terminal may select a target transmission link based on a preset expected latency (round-trip time (RTT)) and a current network latency of each communication link. In some embodiments, the network latency of each communication link is not constant, that is, the network latency of each communication link changes dynamically over time. Therefore, the target transmission link may also be switched dynamically with the network latency.

In some embodiments, the expected latency may be a default value set for the first application, or may be manually modified by the user to complete a custom setting of an expected latency, or may be set to different values by a technical person according to different second applications. A manner of obtaining the expected latency is not specifically limited in this embodiment of the present disclosure. The expected latency may be considered as an expected maximum network latency after acceleration is enabled. In some embodiments, when the first application determines the expected latency based on a type of the second application, for example, for some MOBA games with relatively high network quality requirements, if frame drop or frame freezing may cause a virtual object controlled by the user to be defeated during interaction, a relatively low expected latency may be set; for some MMORPG games with relatively low network quality requirements, if frame drop or frame freezing may not cause great damage to game experience of the user, a relatively high expected latency may be set.

In some embodiments, the terminal may determine the network latency of the mobile communication link based on the following manner: The terminal sends a probing message based on the wireless communication link; and receives, based on the mobile communication link, an ACK message returned based on the probing message, and determines a time difference between a sending moment of the probing message and a receiving moment of the ACK message as the network latency of the mobile communication link.

In some embodiments, the terminal may determine the network latency of the wireless communication link based on the following manner: The terminal sends a probing message based on the wireless communication link; and receives, based on the wireless communication link, an ACK message returned based on the probing message, and determines a time difference between a sending moment of the probing message and a receiving moment of the ACK message as the network latency of the wireless communication link.

In some embodiments, when the network latency of the wireless communication link is lower than the expected latency, the terminal determines the wireless communication link as the target transmission link. In other words, the terminal selects the wireless communication link as the target transmission link. In this case, it can be considered that the terminal is switched to a primary path (such as a Wi-Fi path) transmission mode, and the second application perform data transmission with the target server through the wireless communication link.

In some embodiments, when the network latency of the mobile communication link is lower than the expected latency, the terminal determines the mobile communication link as the target transmission link. In other words, the terminal selects the mobile communication link as the target transmission link. In this case, it can be considered that the terminal is switched to a secondary path (such as an LTE path) transmission mode, and the second application performs data transmission with the target server through the wireless communication link. In some embodiments, the primary path is a preferential path for data transmission, and a data transmission priority of the secondary path is lower than that of the primary path. In this embodiment of the present disclosure, that the primary path is the wireless communication link and the secondary path is the mobile communication link is used as an example for description. In another embodiment, the primary path may alternatively be the mobile communication link, and the secondary path may alternatively be the wireless communication link. This is not limited in this embodiment of the present disclosure.

In some embodiments, the terminal determines both the wireless communication link and the mobile communication link as the target transmission link when the network latencies of the wireless communication link and the mobile communication link are both higher than or equal to the expected latency. In other words, the terminal selects both the wireless communication link and the mobile communication link as the target transmission links together. In this case, it can be considered that the terminal is switched to a redundant transmission mode, and in the redundant transmission mode, the wireless communication link and the mobile communication link transmit the same data. Therefore, this is referred to as redundant transmission.

In the foregoing process, based on a magnitude relationship between the expected latency and the network latencies of the wireless communication link and the mobile communication link, an appropriate communication link may be selected as the target transmission link for the acceleration this time. In other words, if the network latency of the wireless communication link is relatively low, it indicates that network quality of the wireless communication link is good. In this case, the wireless communication link is selected as the target transmission link. If the network latency of the mobile communication link is relatively low, it indicates that network quality of the mobile communication link is good. In this case, the mobile communication link is selected as the target transmission link. If the network latencies of both the mobile communication link and the wireless communication link are relatively high, it indicates that the terminal is in a weak network environment. Therefore, dual channels may be selected as target transmission links together, to perform redundant transmission on the dual channels to reduce an overall network latency.

In some embodiments, after determining the target transmission link, the terminal may alternatively detect and update a network latency of the target transmission link in real time, so that a more appropriate target transmission link can be selected at any time according to a change in a network status. In some embodiments, the terminal sends a probing message based on the wireless communication link, the probing message being used for updating the network latency; receives, based on the target transmission link, an ACK message returned based on the probing message; and determines a time difference between a sending moment of the probing message and a receiving moment of the ACK message as an updated network latency.

In the foregoing process, after determining the target transmission link, a network latency of the target transmission link is dynamically updated to find, in a timely manner, whether a network status of the terminal changes. For example, if the terminal is in a weak network environment, and dual channels are selected as target transmission links, but as time changes, the terminal moves to a place with a better network environment (for example, the user walks out of an elevator), the terminal may be switched to a communication link with a better network environment as the target transmission link, to implement dynamic adaptive switching of transmission links.

In some embodiments, the terminal may not need to perform data transmission with an acceleration server within a particular period of time, but still intends to maintain a target transmission link between the terminal and the acceleration server free from disconnection. Therefore, the terminal may maintain a connected state of the target transmission link through a notification message. In some embodiments, the terminal sends a notification message to the acceleration server based on the target transmission link when no interactive data is transmitted based on the target transmission link within target duration, the notification message being used for maintaining a connected state of the target transmission link. The target duration is any value greater than 0.

In the foregoing process, sending the notification message to the acceleration server can ensure the connected state of the target transmission link without sending interactive data, thereby avoiding cumbersome operations of reconnection when the user has a data transmission requirement again, making user operations easier, and improving user game experience and the efficiency of network acceleration.

In some embodiments, the user may intend to disable a network acceleration function when exiting the second application (such as exiting a game application) or when the network quality becomes better. In this case, the user may enter the first application, and a stop acceleration option is provided in the acceleration function interface of the first application. A stop acceleration instruction on the second application is generated in response to a trigger operation on the stop acceleration option. A channel close message is sent to the acceleration server based on the target transmission link in response to the stop acceleration instruction on the second application, the channel close message being used for indicating to disconnect the target transmission link. Subsequently, the terminal releases communication resources occupied by the target transmission link. Similarly, the acceleration server also releases corresponding communication resources after receiving the channel close message.

In the foregoing process, before the terminal intends to close a channel, the terminal first sends a channel close message to the acceleration server and then releases local communication resources, and meanwhile, the acceleration server also releases communication resources of a cloud server after receiving the channel close message. This can release idle communication resources in a timely manner when there is no data transmission requirement, thereby optimizing a resource allocation policy.

In some embodiments, after determining the target transmission link, the terminal also provides a function of automatically jumping from the first application to the second application, thereby avoiding the need for the user to switch the first application to the backend before starting the second application and a series of other cumbersome operations. In some embodiments, the terminal may display a timing control in the acceleration function interface, the timing control being used for indicating the remaining time for jumping from the first application to the second application; and jump from the first application to the second application in response to the timing control indicating that the remaining time is 0. In some embodiments, the timing control may be in a representation form of a stopwatch, a timing progress bar, a timing icon, or the like. The representation form of the timing control is not specifically limited in this embodiment of the present disclosure.

In some embodiments, the timing control is a countdown control, with a moment at which the user clicks/taps the acceleration option as a start point for countdown, and a jump duration threshold as overall duration for the countdown, until the countdown reaches 0. At this time, display of the countdown control is canceled, and automatic jumping to the second application is performed. In some other embodiments, similar to the countdown control, the timing control may alternatively be a positive timing control, with a moment at which the user clicks/taps the acceleration option as a start point for positive timing, and a jump duration threshold as overall duration for the positive timing, until the positive timing reaches the jump duration threshold. At this time, display of the positive timing control is canceled, and automatic jumping to the second application is performed.

In some embodiments, the jumping from the first application to the second application may be implemented by displaying call access of an intent (used for implementing communication between components of an Android application) based on a manner of a cross-application Activity (an activity component of an Android system).

303. The terminal performs data transmission with the target server corresponding to the second application based on the target transmission link.

In some embodiments, when the terminal performs data transmission based on the target transmission link, description may be provided in two aspects: data sending and data receiving.

I. Perform Data Sending Based on the Target Transmission Link.

During data sending, the terminal first obtains interactive data of the second application to be transmitted, then encapsulates the interactive data based on a target transmission protocol to obtain first data, and finally sends the first data to the target server based on the target transmission link. In some embodiments, the target transmission protocol may be an MP-UDP, or may other transmission protocols. This is not specifically limited in this embodiment of the present disclosure.

In some embodiments, after the second application generates the interactive data to be transmitted, the first application intercepts the interactive data, and then the first application encapsulates the interactive data by using the target transmission protocol to obtain the first data. Then, the terminal sends the first data to the acceleration server based on the target transmission link, so that the acceleration server sends the interactive data obtained by parsing the first data to the target server.

In the foregoing process, if the target transmission links include both the wireless communication link and the mobile communication link, this is equivalent to selecting a redundant transmission mode. In the redundant transmission mode, the terminal sends the first data to the acceleration server on both the channels by using a dual channel transmission capability provided by a kernel layer. The data sent on the two channels are same. The acceleration server processes the first data that arrives first, obtains the interactive data after parsing the first data, and forwards the interactive data to the target server. During the processing of the first data that arrives first, there is no need to wait for the first data that arrives later. The first data that arrives later is discarded or ignored by the acceleration server. In other words, in the redundant transmission mode, data transmitted on a channel on which data transmission is smoother is used, so that the objective of network acceleration can be achieved to the greatest extent.

In an exemplary scenario, that the target transmission protocol is an MP-UDP is used as an example for description. For the interactive data generated by the second application, the interactive data is a UDP packet of a game service. The first application first intercepts the interactive data, and then re-encapsulates the interactive data based on the MP-UDP. Alternatively, the interactive data (UDP packet) may be parsed and then re-encapsulated by using the MP-UDP. The foregoing process is also referred to as a recombination process of the interactive data. The data obtained after the recombination of the interactive data is referred to as the first data (MP-UDP packet). Finally, the first data is sent from the target transmission link to the acceleration server based on the kernel layer of the terminal, and then the acceleration server restores the first data, that is, parses the MP-UDP packet to obtain a UDP packet, that is, the interactive data. The acceleration server then forwards the interactive data to the target server.

II. Perform Data Receiving Based on the Target Transmission Link.

During data receiving, the terminal may receive second data based on the target transmission link, the second data being interactive data returned by the target server to the second application.

In some embodiments, the second data received by the terminal from the target transmission link is forwarded by the acceleration server. In other words, after the target server generates the interactive data to be returned to the second application, the acceleration server intercepts the interactive data. The acceleration server encapsulates the interactive data by using a target transmission protocol to obtain the second data. The acceleration server sends the second data to the first application of the terminal based on the target transmission link. After receiving the second data, the first application parses the second data to obtain the interactive data, and sends the interactive data to the second application.

In an exemplary scenario, that the target transmission protocol is an MP-UDP is used as an example for description. For the interactive data generated by the target server, the interactive data is a UDP packet of a game service. The acceleration server first intercepts the interactive data, and then re-encapsulates the interactive data based on the MP-UDP. Alternatively, the interactive data (UDP packet) may be parsed and then re-encapsulated by using the MP-UDP. The foregoing process is also referred to as a recombination process of the interactive data. The data obtained after the recombination of the interactive data is referred to as the second data (MP-UDP packet, or referred to as a return packet). The acceleration server sends the second data from the target transmission link to the first application of the terminal, and then the first application restores the second data, that is, parses the MP-UDP to obtain the UDP packet, that is, the interactive data. The first application then forwards the interactive data to the second application.

In some embodiments, when the target transmission links include the wireless communication link and the mobile communication link, when the second data is received from either communication link of the wireless communication link and the mobile communication link, the second data is retained when the second data currently received is received for the first time; and the second data is discarded when the currently received second data is not received for the first time.

In the foregoing process, if the target transmission links include both the wireless communication link and the mobile communication link, this is equivalent to selecting a redundant transmission mode. In the redundant transmission mode, the acceleration server sends the second data to the first application of the terminal on both the channels. The first application preferentially processes second data that arrives first, obtains the interactive data after parsing the second data, and forwards the interactive data to the second application. Second data that arrives later is discarded or ignored. This can achieve the objective of network acceleration to the greatest extent.

In some embodiments, the second application continuously generates interactive data during running. Therefore, during the running of the second application, the terminal may further display acceleration description information. The acceleration description information includes at least one of a speed-up effect and network stability. The speed-up effect is used for representing a difference in the network latency before and after the acceleration. The network stability is used for representing a network packet loss status of the target transmission link.

In some embodiments, during the display of the acceleration description information, the acceleration description information may be displayed in a form of a floating window, or the acceleration description information may be displayed in a form of a floating layer prompt bar, or the acceleration description information may be displayed in a form of split screens, or the acceleration description information may be displayed in a form of sub-windows. The manner of displaying the acceleration description information is not specifically limited in this embodiment of the present disclosure.

All the foregoing example technical solutions can be combined in different manners to form other embodiments of the present disclosure, and details are not described herein again.

According to the method provided in this embodiment of the present disclosure, the first application provides a network acceleration function to the second application, and a target transmission link is determined according to a network latency of a mobile communication link and a network latency of a wireless communication link during acceleration, the target transmission link being a transmission link with best network quality. When data is transmitted on the target transmission link, data transmission efficiency is greatly improved. If target transmission links include two transmission links, a dual-channel transmission mechanism can be further achieved, so that a network acceleration effect is optimized.

Figure 4:
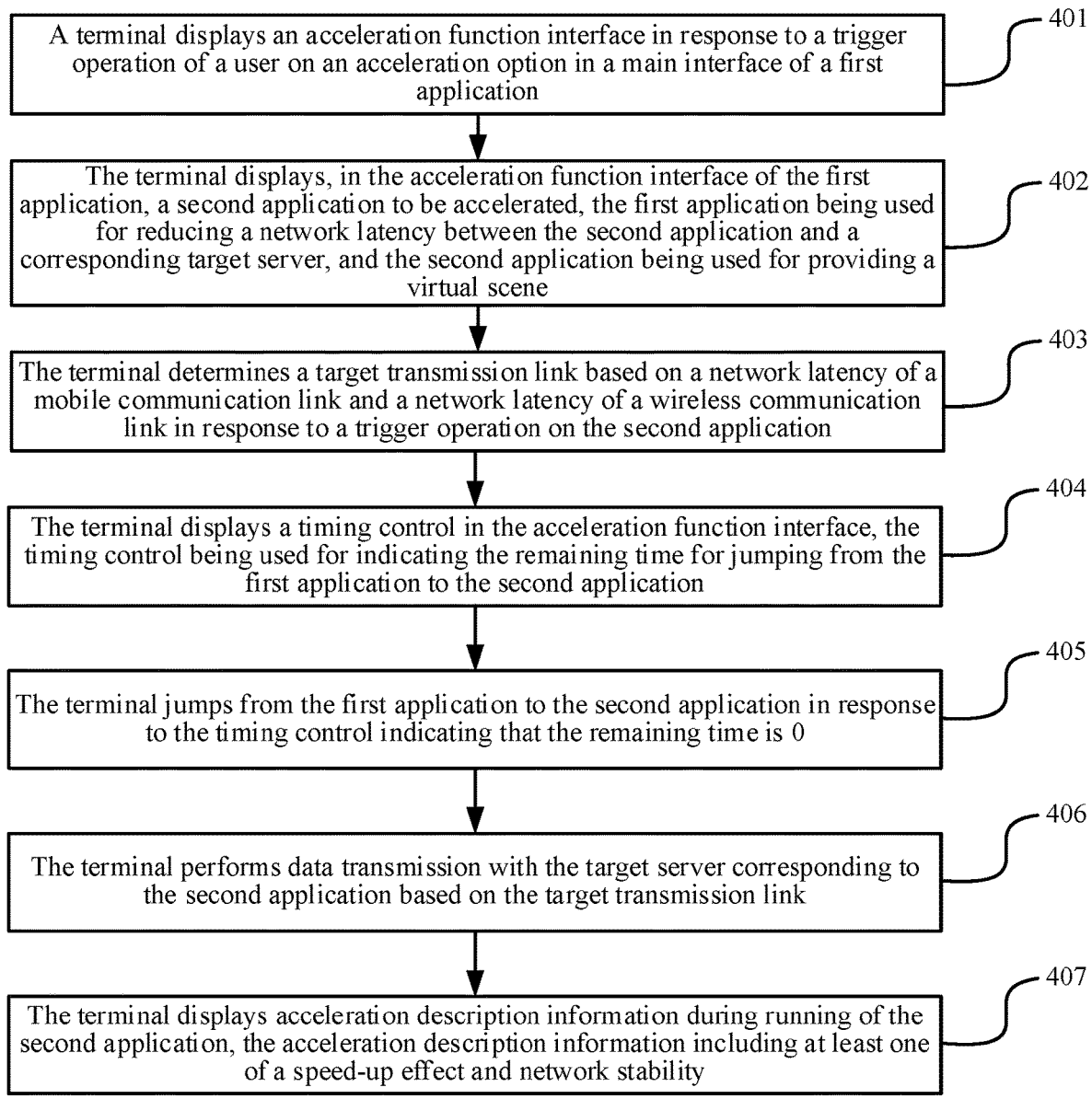
FIG. 4 is a flowchart of a data transmission method according to an embodiment of the present disclosure.

FIG. 4 is a flowchart of a data transmission method according to an embodiment of the present disclosure. Referring to FIG. 4, this embodiment is performed by an electronic device. That the electronic device is a terminal is used as an example for description. This embodiment includes the following steps:

401. The terminal displays an acceleration function interface in response to a trigger operation on an acceleration option in a main interface of a first application.

In some embodiments, the terminal starts the first application in response to the trigger operation of the user on the first application, and displays the main interface of the first application. A plurality of function options including the acceleration option are provided in the main interface. The acceleration function interface is displayed in response to the trigger operation of the user on the acceleration option.

In some embodiments, the trigger operation includes, but is not limited to: a click operation, a touch and hold operation, a double-click operation, a press operation, a slide operation (such as slide left, slide right, slide up, or slide down), a drag operation, a shake operation, a voice command, a gesture command, shortcut key one-key trigger, and the like. A type of the select operation is not specifically limited in this embodiment of the present disclosure.

Figure 5:
FIG. 5 is a schematic diagram of a main interface of a first application according to an embodiment of the present disclosure.

FIG. 5 is a schematic diagram of a main interface of a first application according to an embodiment of the present disclosure. As shown in FIG. 5, a security detection option 501, a junk cleanup option 502, a software management option 503, and a harassment blocking option 504 are included in the main interface 500 of the first application. The security detection option 501 is used for providing a terminal with a full detection function for system security. The junk cleanup option 502 is used for cleaning up useless system resources for the terminal. The software management option 503 is used for installing a new application or uninstalling an existing application. The harassment blocking option 504 is used for setting a voice call that needs to be blocked. In addition, to facilitate a user in traveling during the epidemic, a risk area inquiry option 505, a travel policy inquiry option 506, and a nucleic acid testing appointment option 507 are further provided. The risk area inquiry option 505 is used for inquiring currently risky areas. The travel policy inquiry option 506 is used for inquiring a travel policy of a destination (for example, whether quarantine is required, or whether a negative test result (e.g., PCR test result) within seven days needs to be provided). The testing appointment option 507 is used for making a one-click appointment for medical testing at a local hospital. Further, an acceleration option 508 is further provided, and can perform one-click acceleration mainly in a case of game frame freezing or the like, and automatically jump to a game application (a second application). After the user clicks/taps the acceleration option 508, display of an acceleration function interface can be triggered.

In the foregoing process, the user directly performs a trigger operation on an acceleration option in the main interface of the first application after the first application is started, to enter the acceleration function interface. This can provide a very intuitive human-computer interaction manner.

The foregoing step 401 provides only an example implementation of entering the acceleration function interface by the user. In some embodiments, the terminal may alternatively display the acceleration function interface in response to a trigger operation on an acceleration option in a message notification bar of the first application. In other words, the terminal does not need to enter the main interface of the first application, and even though the first application is currently suspended at a backend, the terminal can directly jump to the first application and enter the acceleration function interface provided that a trigger operation is performed on an acceleration option in a message notification bar (such as a slide down notification bar) of the first application. This can help the user rapidly switch from any interface to the acceleration function interface of the first application.

Figure 6:
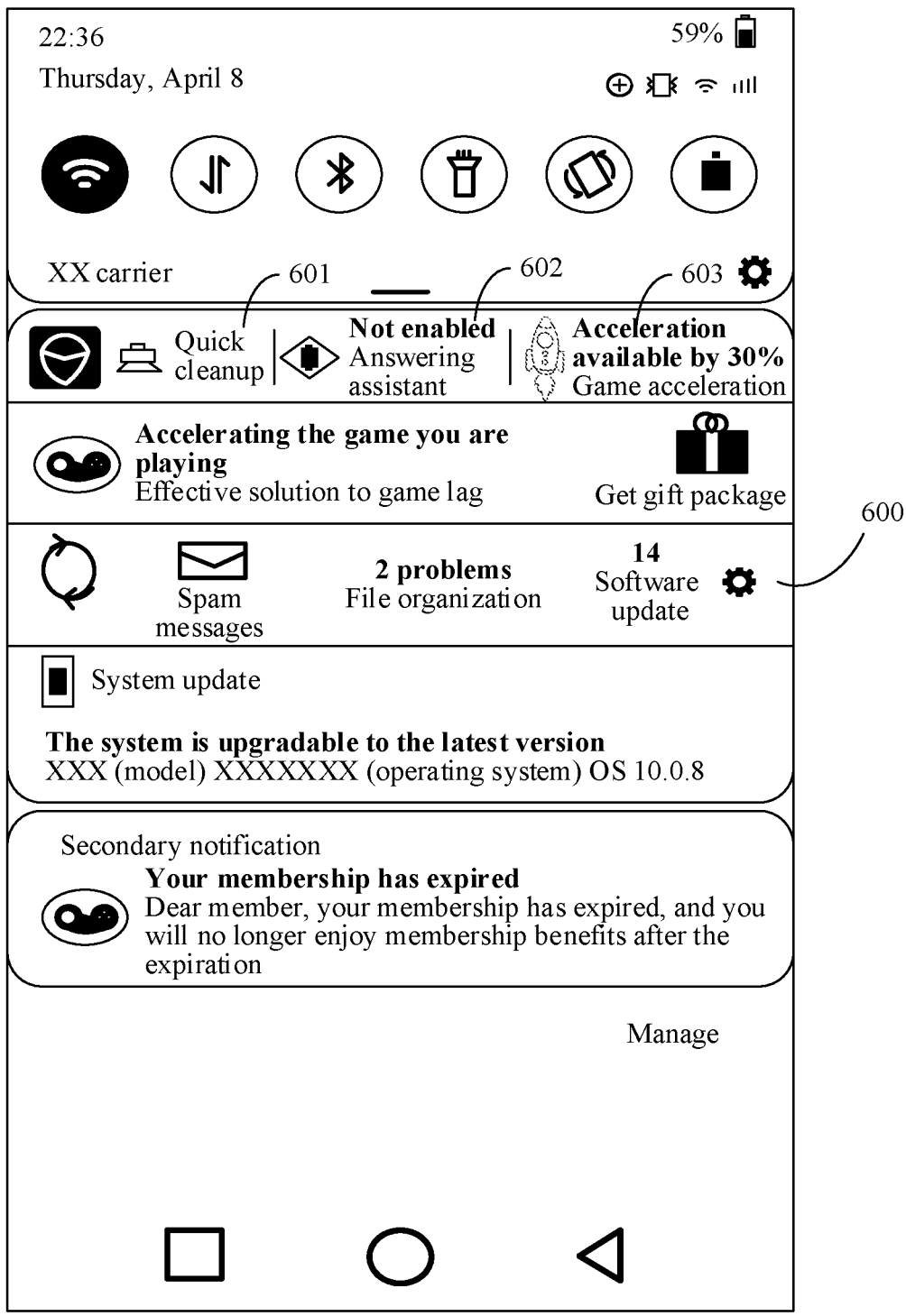
FIG. 6 is a schematic diagram of a message notification bar according to an embodiment of the present disclosure.

FIG. 6 is a schematic diagram of a message notification bar according to an embodiment of the present disclosure. As shown in FIG. 6, that the message notification bar is a drop-down notification bar is used as an example. A plurality of shortcut function options of a second application are displayed in the drop-down notification bar 600, and include a quick cleanup option 601, a call answering assistant option 602, and an acceleration option 603. The quick cleanup option 601 is used for cleaning up useless system resources in a terminal with one click/tap, to release idle resources in a timely manner. The call answering assistant option 602 is used for checking a missed call in a timely manner, setting answering messages, and the like. The acceleration option 603 can perform one-click acceleration for a case of game frame freezing mainly, and automatically jump to a game application (the second application). After a user clicks/taps the acceleration option 603, display of an acceleration function interface can be triggered. In addition, some other shortcut function options may also be displayed in the drop-down notification bar 600, for example, an option to check spam messages, an option to organize files with one click/tap, an option to update all updatable applications with one click/tap, and a settings option. Moreover, a system update prompt and secondary notification information may also be displayed in the drop-down notification bar 600, and no further description is provided herein.

402. The terminal displays, in the acceleration function interface of the first application, a second application to be accelerated, the first application configured to reduce a network latency between the second application and a corresponding target server, and the second application configured to provide a virtual scene.

The foregoing step 402 is based on the same inventive idea as the foregoing step 301, and the details are not described herein again.

Figure 7:
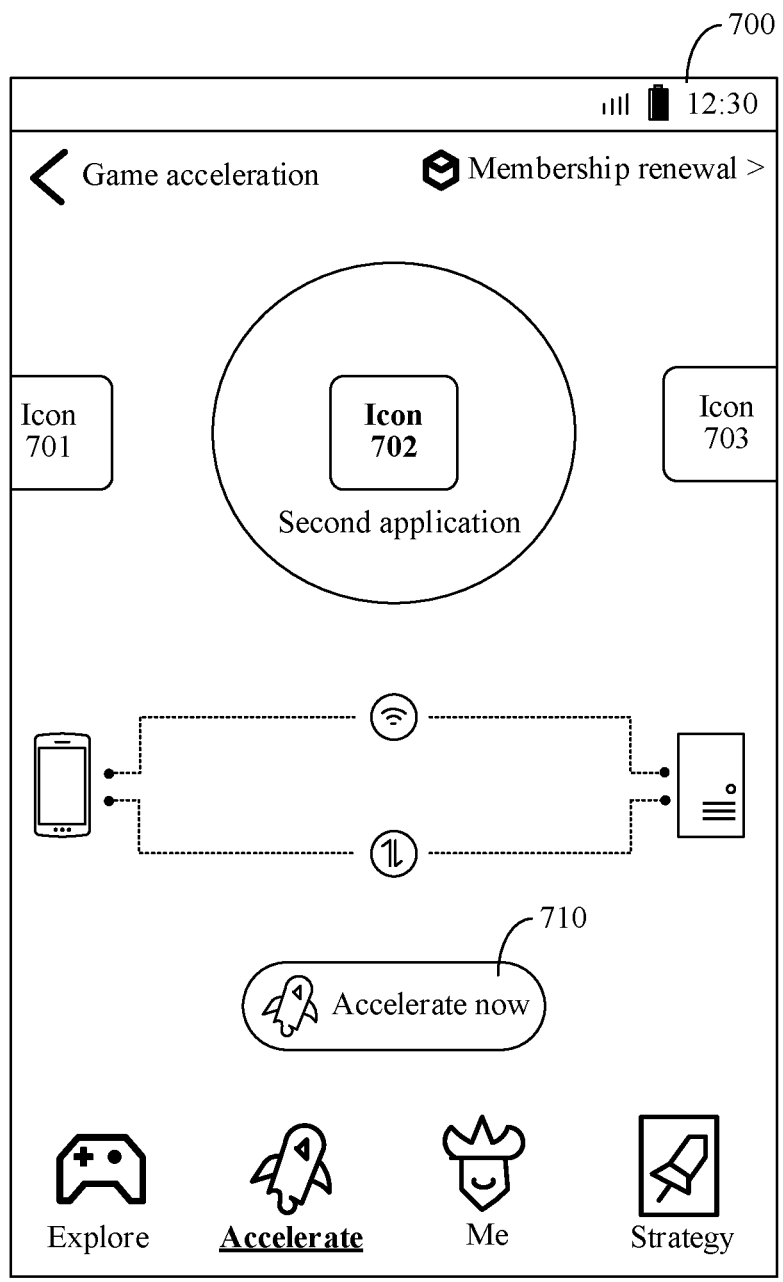
FIG. 7 is a schematic diagram of an acceleration function interface according to an embodiment of the present disclosure.

FIG. 7 is a schematic diagram of an acceleration function interface according to an embodiment of the present disclosure. As shown in FIG. 7, application icons 701 to 703 of a plurality of applications to be accelerated are provided in the acceleration function interface 700. An application corresponding to the selected application icon 702 located in the center of the interface is a second application. An acceleration option 710 is further provided below the application icon 702. The acceleration option 710 is used for providing a network acceleration (for example, game acceleration) function for the second application. A user may select, through a slide left operation, an application corresponding to the application icon 701 as a second application, or may select, through a slide right operation, an application corresponding to the application icon 703 as a second application. In FIG. 7, that the second application is switched by the slide left or slide right operation is used only as an example for description. In some embodiments, if one or more applications to be accelerated are arranged up and down, the second application may alternatively be switched by a slide up or slide down operation. No further description is provided herein.

Figure 8:
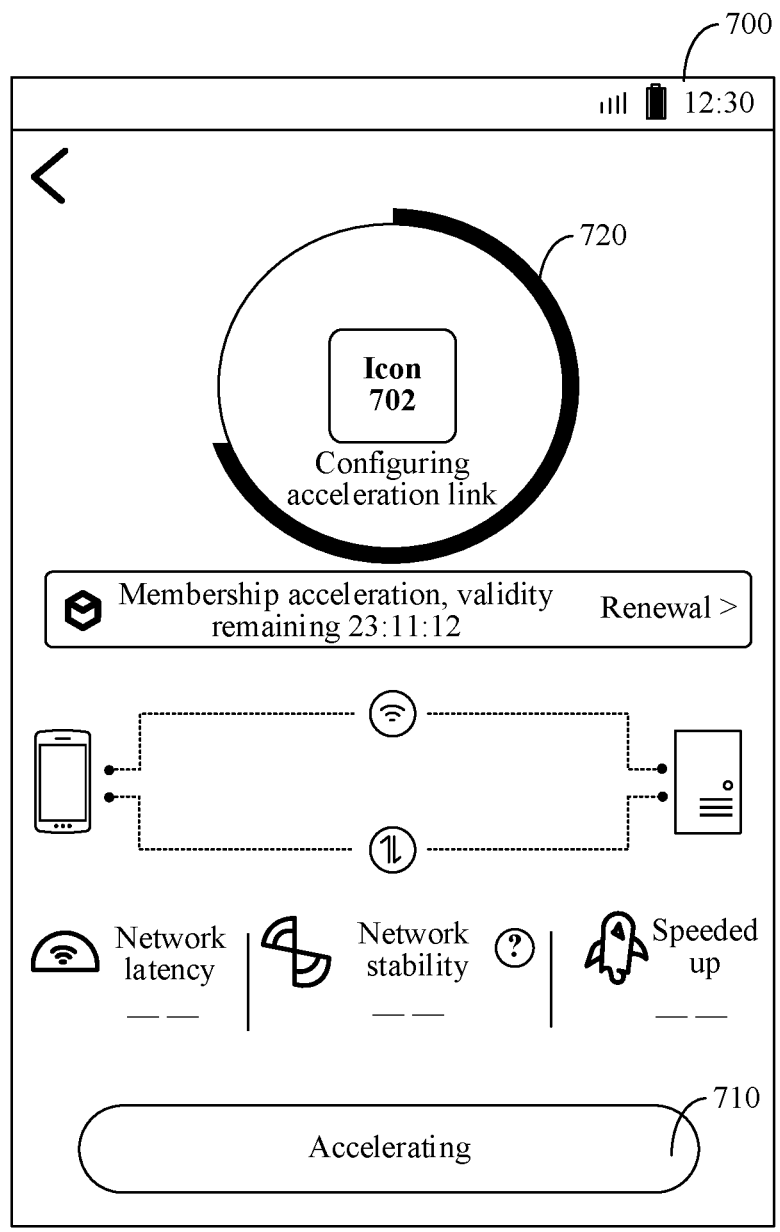
FIG. 8 is a schematic diagram of an acceleration function interface according to an embodiment of the present disclosure.

FIG. 8 is a schematic diagram of an acceleration function interface according to an embodiment of the present disclosure. As shown in FIG. 8, after a user clicks/taps the acceleration option 710 in the acceleration function interface 700, the acceleration option 710 switches from an active state to an inactive state. The acceleration option 710 in the active state may display prompt text "accelerate now" (as shown in FIG. 7), while the acceleration option 710 in the inactive state may display prompt text "accelerating" (as shown in FIG. 8). In addition, during acceleration, an outer edge of the application icon 702 of the second application is actually an acceleration configuration progress bar 720, used for displaying a configuration progress of an acceleration link. During configuration, the target transmission link needs to be determined in real time. Therefore, after the target transmission link is determined, it is considered that the configuration of the acceleration link, that is, the target transmission link, is completed. In addition, the acceleration configuration progress bar 720 also shows that the maximum progress has been reached. Because the target transmission link is being configured at this time, the acceleration description information (the network latency, network stability, the speed-up effect, and the like) during the configuration is displayed as empty.

Figure 9:
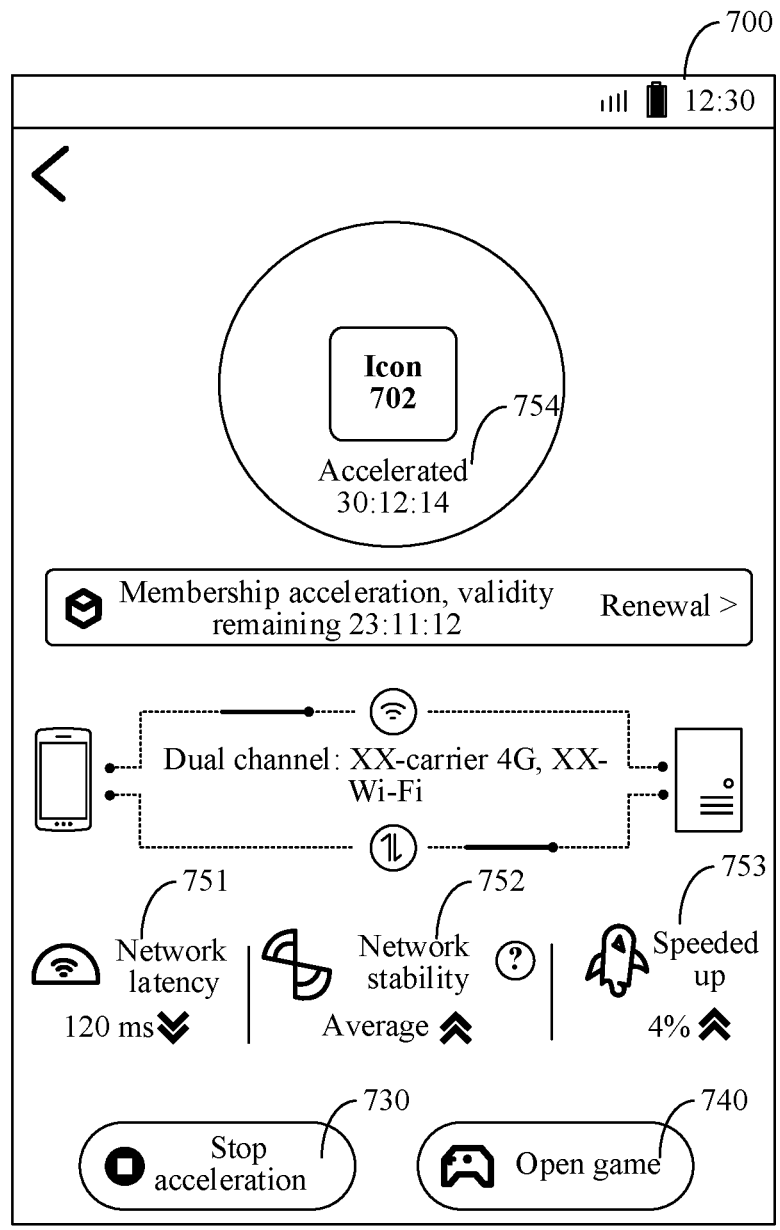
FIG. 9 is a schematic diagram of an acceleration function interface according to an embodiment of the present disclosure.

FIG. 9 is a schematic diagram of an acceleration function interface according to an embodiment of the present disclosure. As shown in FIG. 9, after the user clicks/taps the acceleration option 710 in the acceleration function interface 700, the terminal configures the target transmission link. After the configuration is completed, a stop acceleration option 730 and a start option 740 for the second application are displayed in the acceleration function interface 700. The stop acceleration option 730 may be used for disabling the network acceleration function of the first application at any time. The start option 740 is used for the user to manually trigger jumping from the first application to the second application. In some embodiments, acceleration description information is further displayed in the acceleration function interface 700. The acceleration description information includes, but is not limited to, network latency information 751, network stability information 752, and speed-up effect information 753. In addition, acceleration duration information 754 of the acceleration currently performed on the second application may be further displayed, so that a more intuitive feedback effect can be achieved, thereby improving human-computer interaction efficiency.

403. The terminal determines a target transmission link based on a network latency of a mobile communication link and a network latency of a wireless communication link in response to a trigger operation on the second application, the target transmission link including at least one of the mobile communication link and the wireless communication link.

The foregoing step 403 is based on the same inventive idea as the foregoing step 302, and the details are not described herein again.

404. The terminal displays a timing control in the acceleration function interface, the timing control being used for indicating the remaining time for jumping from the first application to the second application.

In some embodiments, the timing control may be a stopwatch, a timing progress bar, a timing icon, or the like. A representation form of the timing control is not specifically limited in this embodiment of the present disclosure.

In some embodiments, the timing control may be a countdown control, with a moment at which the user clicks/taps the acceleration option as a start point for countdown, and a jump duration threshold as overall duration for the countdown.

In some other embodiments, similar to the countdown control, the timing control may alternatively be a positive timing control, with a moment at which the user clicks/taps the acceleration option as a start point for positive timing, and a jump duration threshold as overall duration for the positive timing.

In some embodiments, the terminal may display the timing control in a central region of the acceleration function interface, or may display the timing control in an edge region of the acceleration function interface, or may directly display the timing control in the acceleration option of the acceleration function interface. A display location of the timing control is not specifically limited in this embodiment of the present disclosure.

405. The terminal jumps from the first application to the second application in response to the timing control indicating that the remaining time is 0.

In some embodiments, when the timing control is a countdown control, when the countdown is 0, it indicates that the remaining time is 0. In some other embodiments, when the timing control is a timing control, when the positive timing is the jump duration threshold, it indicates that the remaining time is 0.

In some embodiments, the jumping from the first application to the second application may be implemented by displaying call access of an intent (used for implementing communication between components of an Android application) based on a manner of a cross-application Activity (an activity component of an Android system).

In the foregoing steps 404 and 405, after determining the target transmission link, the terminal may also provide a function of automatically jumping from the first application to the second application, thereby avoiding the need for the user to switch the first application to the backend before starting the second application and a series of other cumbersome operations, and making user operations easier.

406. The terminal performs data transmission with the target server corresponding to the second application based on the target transmission link.

The foregoing step 406 is based on the same inventive idea as the foregoing step 303, and the details are not described herein again.

407. The terminal displays acceleration description information during running of the second application, the acceleration description information including at least one of a speed-up effect and network stability, the speed-up effect being used for representing a difference in the network latency before and after acceleration, and the network stability being used for representing a network packet loss status of the target transmission link.

In some embodiments, during the display of the acceleration description information, the acceleration description information may be displayed in a form of a floating window, or the acceleration description information may be displayed in a form of a floating layer prompt bar, or the acceleration description information may be displayed in a form of split screens, or the acceleration description information may be displayed in a form of sub-windows. The manner of displaying the acceleration description information is not specifically limited in this embodiment of the present disclosure.

Figure 10:
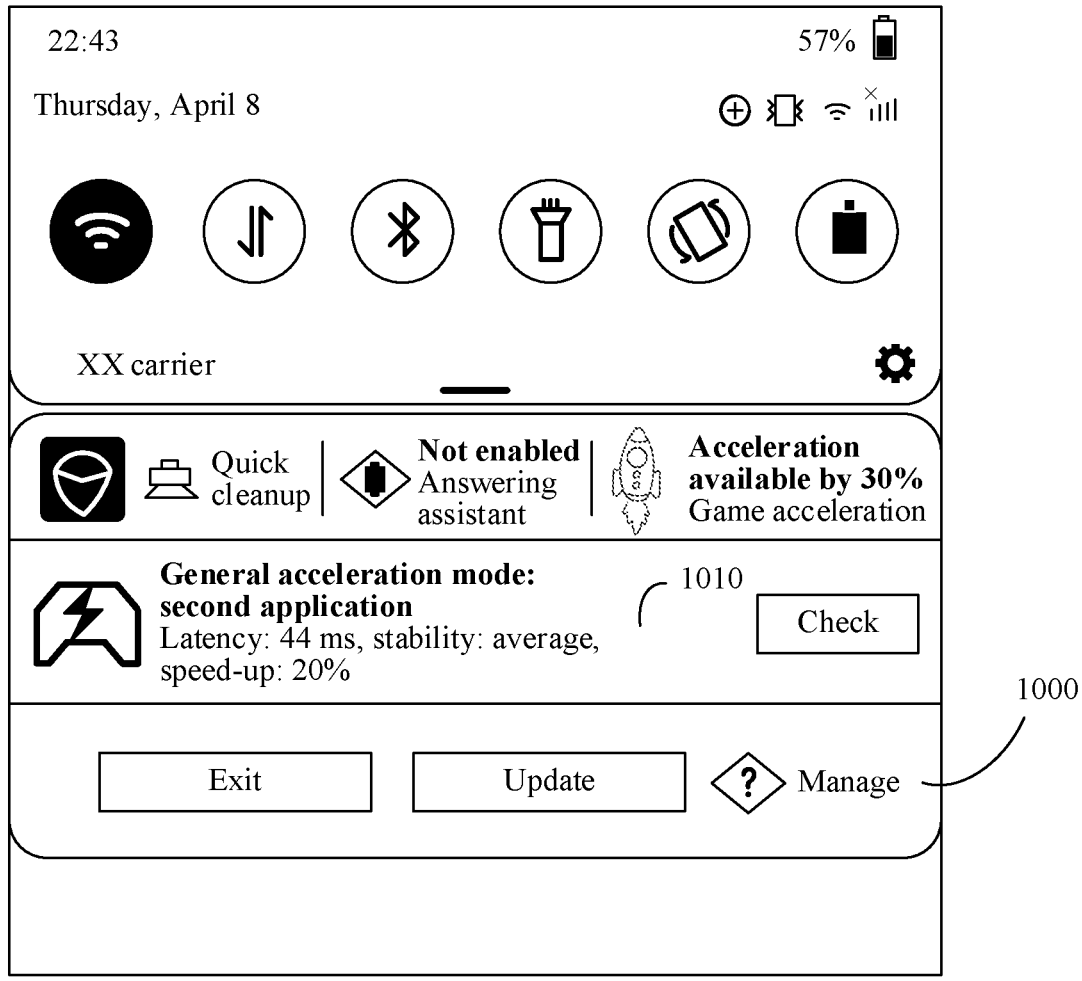
FIG. 10 is a schematic diagram of displaying acceleration description information according to an embodiment of the present disclosure.

FIG. 10 is a schematic diagram of displaying acceleration description information according to an embodiment of the present disclosure. As shown in FIG. 10, during running of a second application, acceleration description information 1010 of the second application may be displayed in a form of a floating window in a slide-down notification bar 1000. The acceleration description information 1010 includes "latency: 44 ms, stability: average, speed-up: 20%", which can intuitively feed back a speed-up effect before and after acceleration, thereby improving human-computer interaction efficiency during network acceleration.

In the foregoing process, displaying the acceleration description information can feed back, to the user in real time, a real-time statistical result of the acceleration process, including a speed-up effect and network stability, and may further include duration for which acceleration has been performed, thereby providing a good feedback effect for the user.

Figure 11:
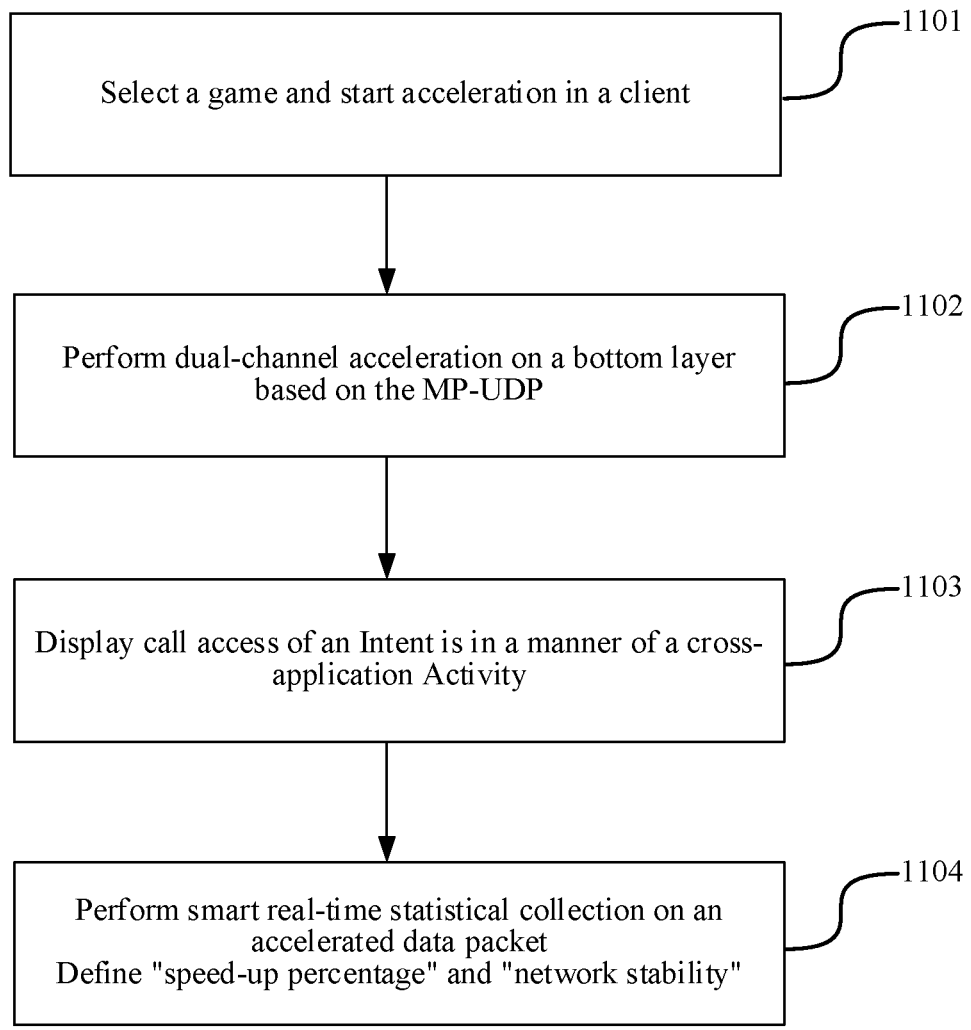
FIG. 11 is a principle flowchart of a data transmission method according to an embodiment of the present disclosure.

FIG. 11 is a principle flowchart of a data transmission method according to an embodiment of the present disclosure. Referring to FIG. 11, in step 1101, a user selects a game (that is, a second application) and starts acceleration in a client (that is, a first application). In step 1102, a bottom layer (that is, a kernel layer) performs dual-channel acceleration based on the MP-UDP. In step 1103, call access of an Intent is displayed in a manner of a cross-application Activity, that is, automatic jumping from the client to the game is performed after smart countdown ends. In step 1104, smart real-time statistical collection is performed on an accelerated data packet, where a speed-up percentage (used for representing a change in a network latency before and after the acceleration) and network stability (used for representing whether a currently network packet loss status is good) are defined.

All the foregoing example technical solutions can be combined in different manners to form other embodiments of the present disclosure, and details are not described herein again.

According to the method provided in this embodiment of the present disclosure, the first application provides a network acceleration function to the second application, and a target transmission link is determined according to a network latency of a mobile communication link and a network latency of a wireless communication link during acceleration, the target transmission link being a transmission link with best network quality. When data is transmitted on the target transmission link, data transmission efficiency is greatly improved. If target transmission links include two transmission links, a dual-channel transmission mechanism can be further achieved, so that a network acceleration effect is optimized.

In the foregoing embodiments, how network acceleration is performed between the terminal and the target server is described. During the acceleration, an appropriate target transmission link needs to be selected in real time according to an actual network latency of the mobile communication link and an actual network latency of the wireless communication link. The three example selection cases for the target transmission link respectively correspond to three different inter-channel data transmission modes (that is, data scheduling policies). In addition, to better implement channel scheduling, four example control messages are further provided. In the embodiments of the present disclosure, transmission manners of interactive data and control messages are to be described in detail with reference to the three data transmission modes.

Figure 12:
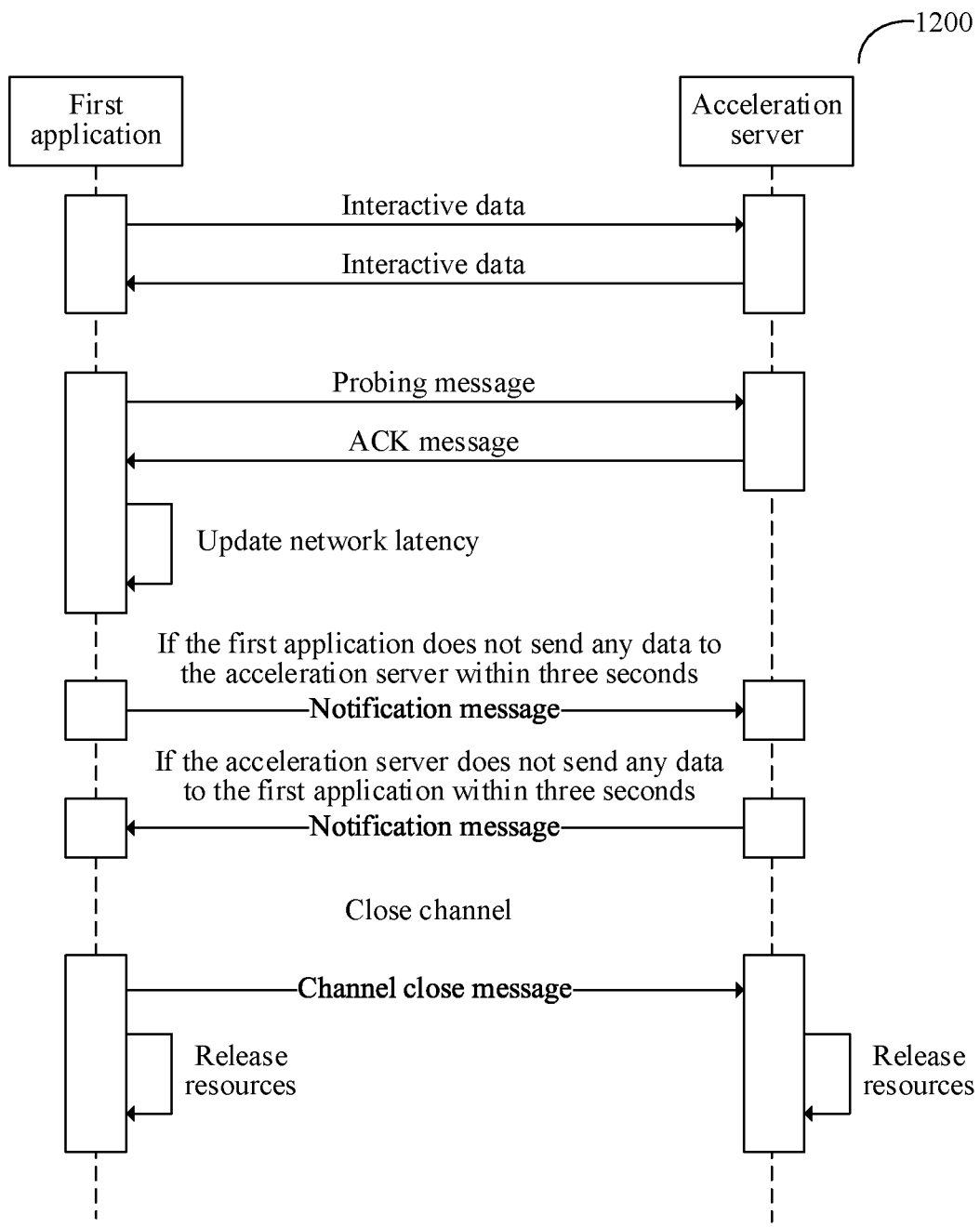
FIG. 12 is a schematic principle diagram of sending logic for a control message according to an embodiment of the present disclosure.

FIG. 12 is a schematic principle diagram of sending logic for a control message according to an embodiment of the present disclosure. As shown by 1200, only how interactive data and a control message are transmitted between a first application and an acceleration server is described. First, the first application and the acceleration server can send interactive data to each other. Second, the first application sends a probing message to the acceleration server, and the acceleration server returns an ACK message to the first application. The first application can calculate an updated network latency according to a sending moment of the probing message and a receiving moment of the ACK message. Third, if the first application does not send any data to the acceleration server within target duration (for example, three seconds), the first application sends a notification message to the acceleration server. Similarly, if the acceleration server does not send any data to the first application within target duration (for example, three seconds), the acceleration server sends a notification message to the first application. Finally, before a channel is closed, the first application sends a channel close message to the acceleration server, and then the first application releases corresponding communication resources. The acceleration server also releases corresponding communication resources after receiving the channel close message.

The following describes the three data transmission modes and data sending logic in each data transmission mode.

1. Redundant Transmission Mode

In the redundant transmission mode, the target transmission links include a total of two paths: the mobile communication link and the wireless communication link.

During data sending, after the second application generates interactive data, the first application intercepts the interactive data, and encapsulates the interactive data by using the MP-UDP to obtain first data. The first application sends the first data to the acceleration server on both the mobile communication link and the wireless communication link. The acceleration server preferentially processes first data that arrives first, parses the first data to obtain the interactive data, and forwards the interactive data to the target server. First data that arrives later is discarded. After receiving any data packet, the acceleration server obtains a data packet sequence number (seqNum, used for uniquely identifying a data packet) of this data packet. If the seqNum is the same as the seqNum of a previous received data packet, it is determined that the currently received data packet is a redundancy packet (that is, a packet not received for the first time). In this case, this data packet is discarded or ignored, thereby avoiding repeated sending of the same data to the target server or repeated packet returning to the first application.

The acceleration server does not need to wait for reception of the first data on both channels before forwarding the first data to the target server, but forwards the first data to the target server immediately after receiving the first data sent by either channel. This is because waiting causes an additional network latency and amplifies a problem caused by a network packet loss.

Similarly, during data receiving, interactive data returned by the target server during packet returning is intercepted by the acceleration server. The acceleration server encapsulates the interactive data by using the MP-UDP to obtain second data. The acceleration server sends the second data to the first application on both the mobile communication link and the wireless communication link. The first application preferentially processes second data that arrives first, parses the second data to obtain the interactive data, and forwards the interactive data to the second application. Second data that arrives later is discarded. After receiving any data packet, the first application obtains a seqNum of this data packet. If the seqNum is the same as the seqNum of a previous received data packet, it is determined that the currently received data packet is a redundancy packet (that is, a packet not received for the first time). In this case, this data packet is discarded or ignored, thereby avoiding repeated sending of the same data to the second application or repeated packet returning to the acceleration server.

The first application does not need to wait for reception of the second on both channels before forwarding the second data to the second application. This is because waiting causes an additional network latency and amplifies a problem caused by a network packet loss.

From the perspective of acceleration effect, the redundant transmission mode is the optimal transmission mode, but from the perspective of communication costs, the redundant transmission mode brings relatively large bandwidth costs.

Figure 13:
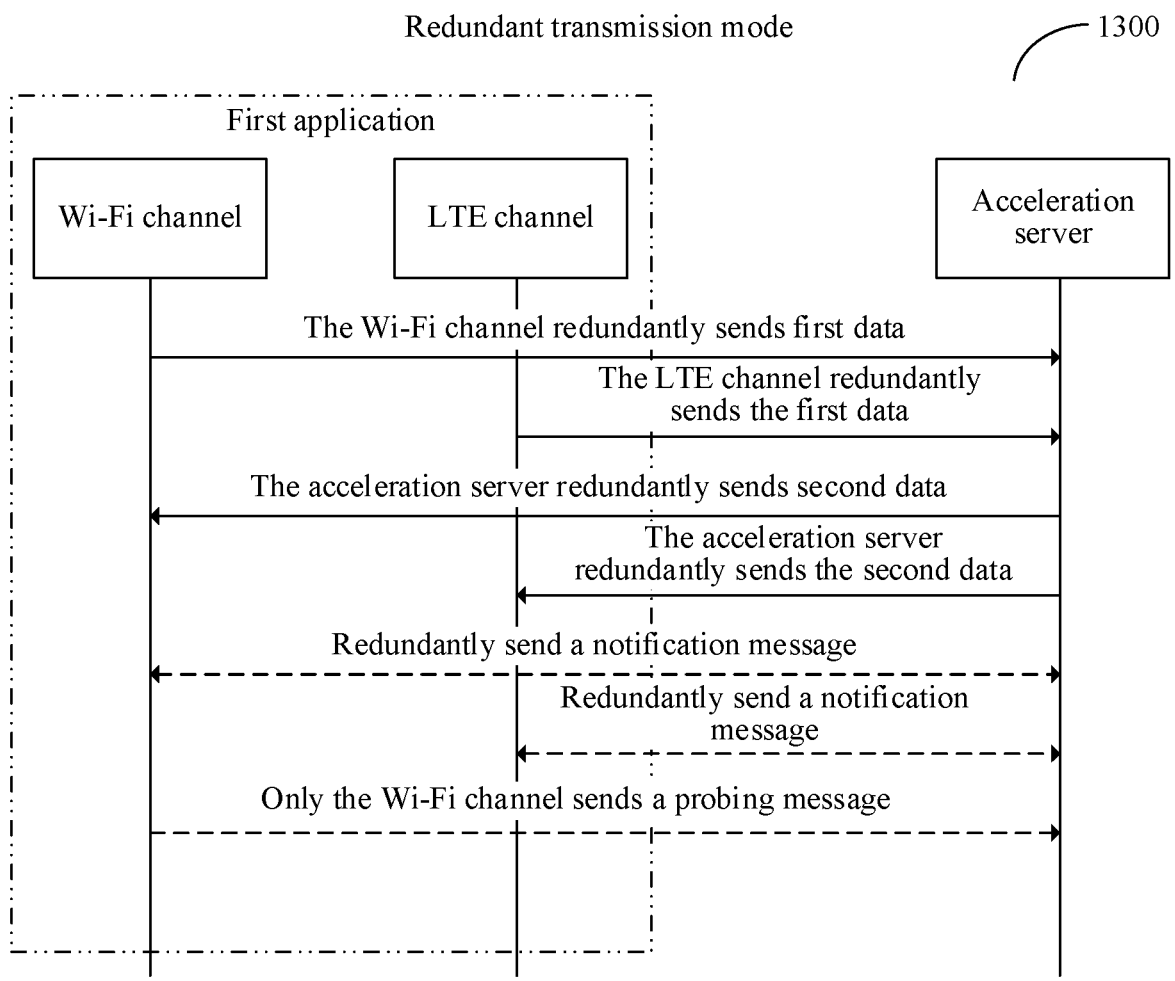
FIG. 13 is a communication flowchart of a redundant transmission mode according to an embodiment of the present disclosure.

FIG. 13 is a communication flowchart of a redundant transmission mode according to an embodiment of the present disclosure. As shown by 1300, target transmission links include a Wi-Fi channel (a wireless communication link) and an LTE channel (a mobile communication link), a first application redundantly sends first data on the Wi-Fi channel and the LTE channel, respectively, and an acceleration server also redundantly sends second data on the Wi-Fi channel and the LTE channel, respectively. Further, if the first application or the acceleration server does not transmit any data to the other party for more than target duration (for example, three seconds), the first application or the acceleration server redundantly sends a notification message on the Wi-Fi channel and the LTE channel. However, the first application sends a probing message only on the Wi-Fi channel.

2. Primary Path Transmission Mode

In the primary path transmission mode, the target transmission link includes only the wireless communication link. In other words, a data packet is transmitted only on the Wi-Fi channel. The primary path transmission mode is used only when a network latency of the Wi-Fi channel is lower than an expected latency, thereby reducing bandwidth costs and client performance consumption while ensuring transmission stability.

Figure 14:
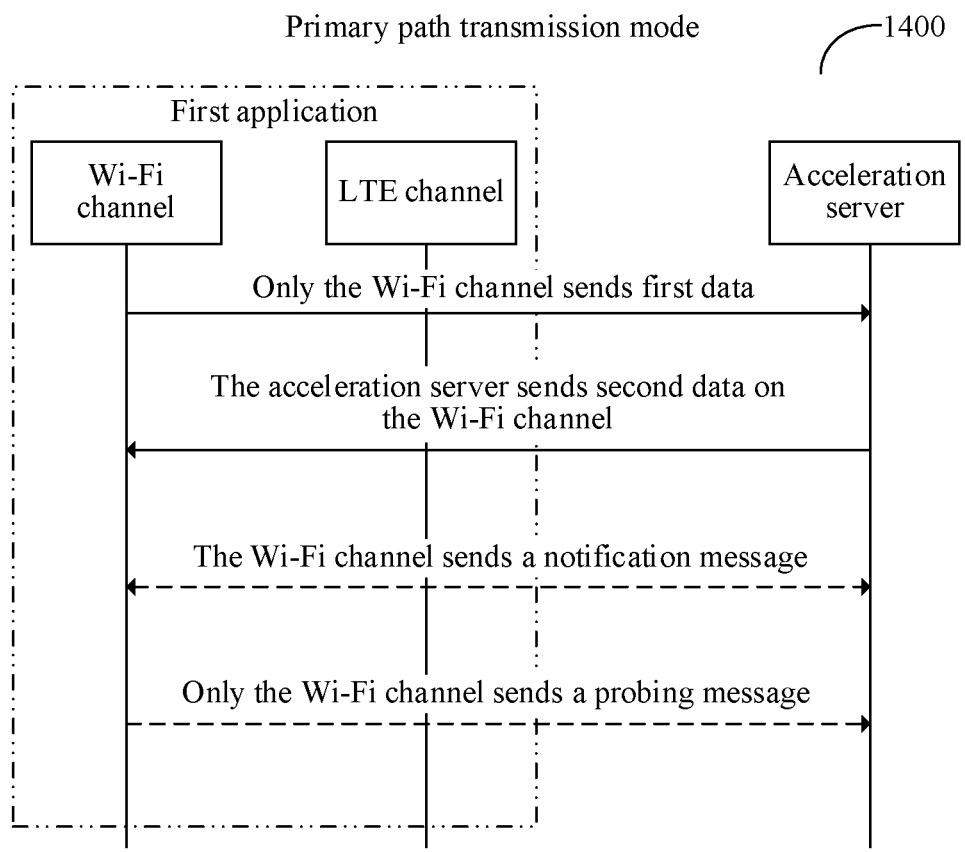
FIG. 14 is a communication flowchart of a primary path transmission mode according to an embodiment of the present disclosure.

FIG. 14 is a communication flowchart of a primary path transmission mode according to an embodiment of the present disclosure. As shown by 1400, a target transmission link includes only a Wi-Fi channel (a wireless communication link), a first application sends first data only on the Wi-Fi channel, and an acceleration server sends second data only on the Wi-Fi channel. Further, if the first application or the acceleration server does not transmit any data to the other party for more than target duration (for example, three seconds), the first application or the acceleration server also sends a notification message only on the Wi-Fi channel. In addition, the first application sends a probing message only on the Wi-Fi channel.

3. Secondary Path Transmission Mode

In the secondary path transmission mode, the target transmission link includes only the mobile communication link. In other words, a data packet is transmitted only on the LTE channel. The secondary path transmission mode is used only when a network latency of the Wi-Fi channel is higher than or equal to an expected latency (that is, the Wi-Fi channel is unstable) and a network latency of the LTE channel is lower than the expected latency. The secondary path transmission mode consumes user traffic, but can reduce bandwidth costs and client performance consumption while ensuring transmission stability.

Figure 15:
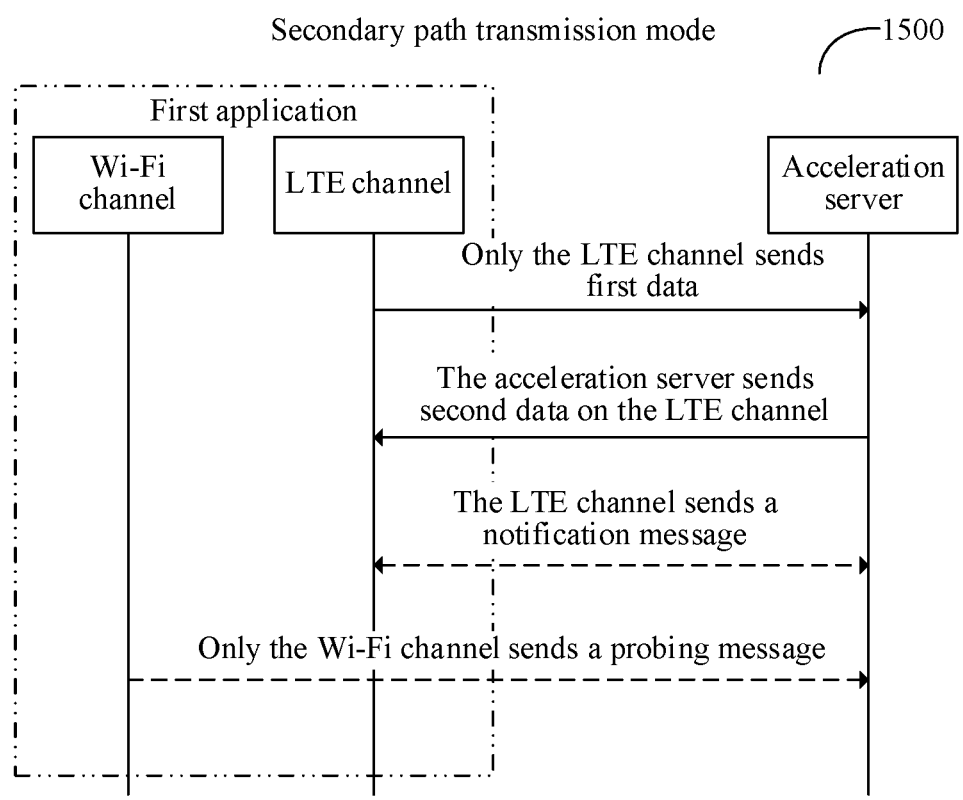
FIG. 15 is a communication flowchart of a secondary path transmission mode according to an embodiment of the present disclosure.

FIG. 15 is a communication flowchart of a secondary path transmission mode according to an embodiment of the present disclosure. As shown by 1500, a target transmission link includes only an LTE channel (a mobile communication link), a first application sends first data only on the LTE channel, and an acceleration server sends second data only on the LTE channel. Further, if the first application or the acceleration server does not transmit any data to the other party for more than target duration (for example, three seconds), the first application or the acceleration server also sends a notification message only on the LTE channel. However, the first application still sends a probing message on the Wi-Fi channel (instead of the LTE channel).

In this embodiment of the present disclosure, based on the terminal MP-UDP protocol layer linkage, performing selective scheduling or dual-channel redundant transmission on the Wi-Fi/LTE two paths can implement a stable and low-latency acceleration solution for end-cloud transmission. Data packet transmission between the second application and the target server can be optimized and improved in efficiency to create a highly stable, low-latency, and smooth network experience environment (such as a game network experience environment). In a case of a laboratory, an overall network of the terminal can be made to reach a network level of e-sports acceleration, thereby alleviating an overall network frame freezing status during acceleration, and greatly improving the performance and effect of network acceleration.

Further, the automatic jumping to the second application directly after the first application provides the acceleration configuration allows the user to log in without an account during the acceleration. In addition, acceleration description information can be displayed based on a real-time floating window technology to prompt game network data. This can increase the overall operation convenience and fun of game acceleration while ensuring a smooth game network environment, allowing a user to have favorable user experience, and can improve product capability promotion and brand building.

Further, the acceleration server is deployed before the target server, can reuse automatic load balancing of the game server, and has high processing performance and a strong anti-attack capability. In addition, no additional bandwidth costs are required, thereby minimizing network latency consumption and ensuring the acceleration effect. Moreover, routing of the acceleration server can be automatically expanded to ensure a resilience capability of the acceleration function. Finally, this pre-deployment policy can also cover more second applications and target servers corresponding thereto.

Test results of demo packet test data are described below.

As shown in Table 1, in a demo packet test manner, 10 sockets are open at the same time in each of different scenarios, and 100 UDP packets and 10000 UDP packets are respectively sent and an average latency of the data packets is calculated. The network environment includes a normal Wi-Fi and normal 4G environment, and a weak Wi-Fi and normal 4G environment.

TABLE 1

| Scenario | Indicator | MP-UDP | Normal Wi-Fi + normal 4G | Weak Wi-Fi + normal 4G | | | |
|---|---|---|---|---|---|---|---|
| | | | | Wi-Fi latency of 40 ms | Wi-Fi latency of 50 ms | Wi-Fi latency of 60 ms | Wi-Fi latency of 100 ms |
| 100 packets | Latency (ms) | Used | 23.113 | 46.575 | 54.708 | 35.929 | 36.049 |
| | | Not used | 11.874 | 34.796 | 45.030 | 54.571 | 95.856 |
| | Packet loss (%) | Used | 0.00 | 1.00 | 0.00 | 0.00 | 0.00 |
| | | Not used | 0.00 | 0.60 | 0.00 | 0.00 | 0.00 |
| 10000 packets | Latency (ms) | Used | 26.487 | 49.933 | 56.127 | 50.123 | 51.513 |
| | | Not used | 16.967 | 43.347 | 58.680 | 64.807 | 120.617 |
| | Packet loss (%) | Used | 0.00 | 0.36 | 0.00 | 0.09 | 0.08 |
| | | Not used | 0.10 | 0.07 | 0.00 | 1.04 | 0.10 |

It can be learned that, when the network latency of the Wi-Fi channel is relatively low (for example, lower than 50 ms), the network latency increases slightly due to the need for transition in the first application and the acceleration server for the dual channels. When the network latency of the Wi-Fi channel is relatively high, after dual-channel acceleration is enabled, the average latency can be reduced to less than 40 ms, thereby greatly reducing the network latency and alleviating a network frame freezing phenomenon.

Test results of actual game testing data of a plurality of game applications are described below by using an example in which the second application is a game application.

An actual game testing manner refers to testing one or more game applications respectively before and after dual-channel acceleration is enabled.

Figure 16:
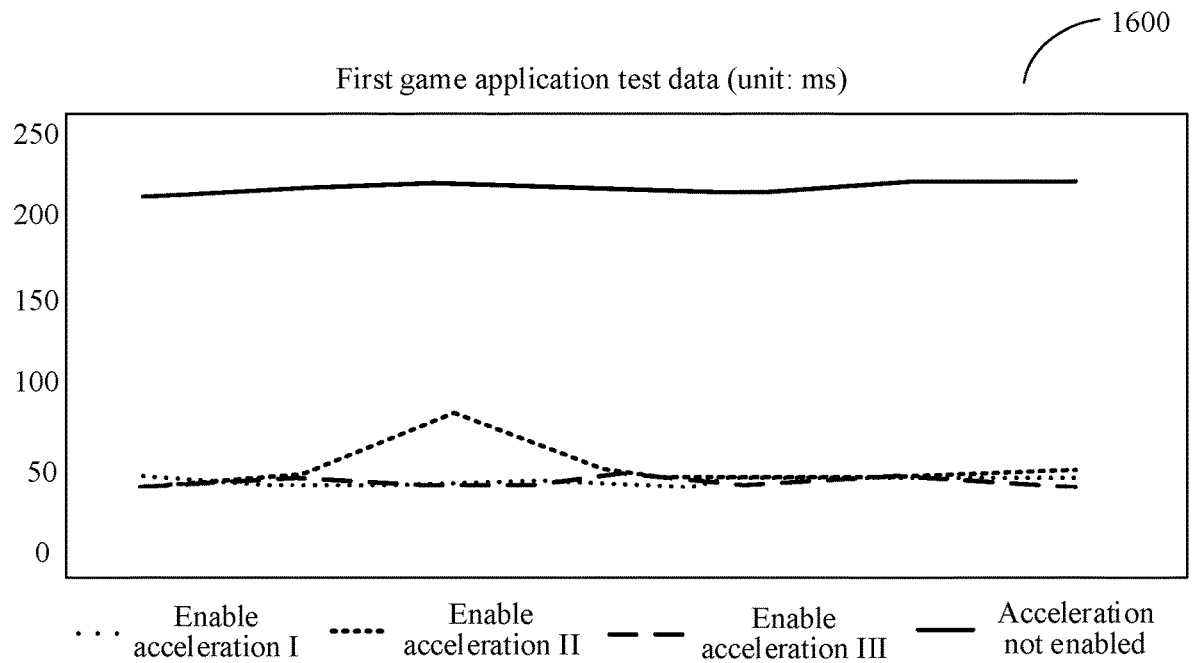
FIG. 16 is a comparison diagram of test effects before and after dual-channel acceleration is enabled for a first game application.

FIG. 16 is a comparison diagram of test effects before and after dual-channel acceleration is enabled for a first game application. As shown by 1600, a function test of dual-channel acceleration is carried out on the first game application when a latency of 200 ms is set for a Wi-Fi channel. It can be learned that, after the dual-channel acceleration is enabled, a network latency of the first game application can be reduced to approximately 50 ms and is very stable, with the highest latency reaching only 84 ms. As a comparison with a case that no acceleration is enabled, the network latency is up to 200 ms or more.

Figure 17:
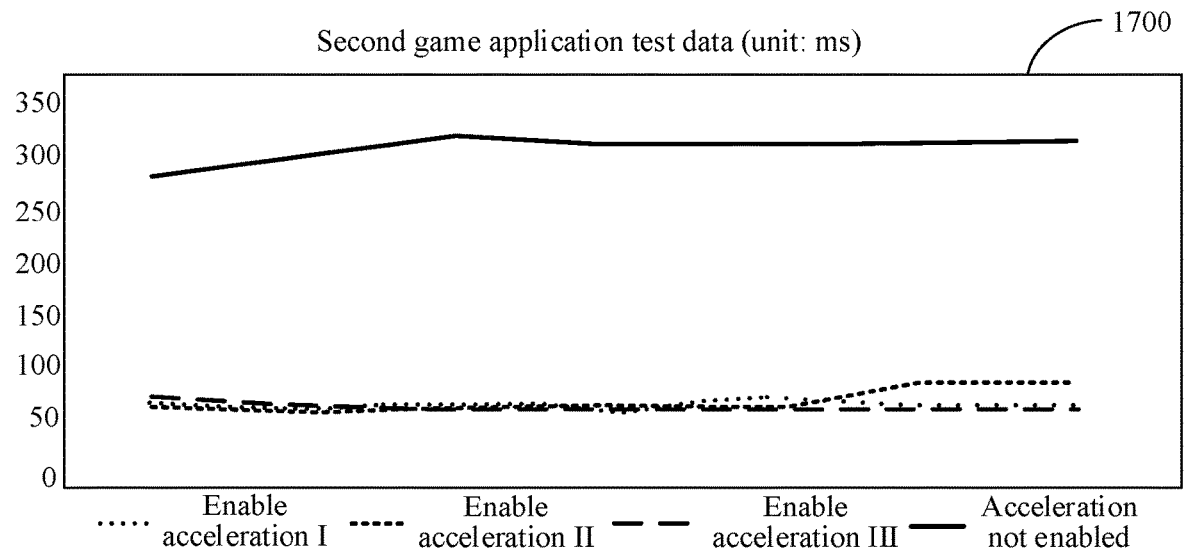
FIG. 17 is a comparison diagram of test effects before and after dual-channel acceleration is enabled for a second game application.

FIG. 17 is a comparison diagram of test effects before and after dual-channel acceleration is enabled for a second game application. As shown by 1700, a function test of dual-channel acceleration is carried out on the second game application when a latency of 200 ms is set for a Wi-Fi channel. It can be learned that, after the dual-channel acceleration is enabled, a network latency of the second game application can be reduced to less than 100 ms and is very stable. As a comparison with a case that no acceleration is enabled, the network latency is up to 300 ms or more.

To sum up, the data transmission method provided in this embodiment of the present disclosure can greatly reduce the network latency of the second application, thereby significantly reducing the occurrence of poor user experience such as frame freezing or disconnection, and improving game experience of a user under weak network conditions. Through reconstruction and building of a protocol layer by going deep into an underlying link for network transmission, and innovative mixed multi-channel transmission of data, a user requirement for multi-channel smooth acceleration can be met, and the experience of intelligent acceleration is complemented, thereby achieving automation of acceleration. In addition, the data can be intelligently and intuitively displayed, thereby meeting a perception requirement on the user side.

Figure 18:
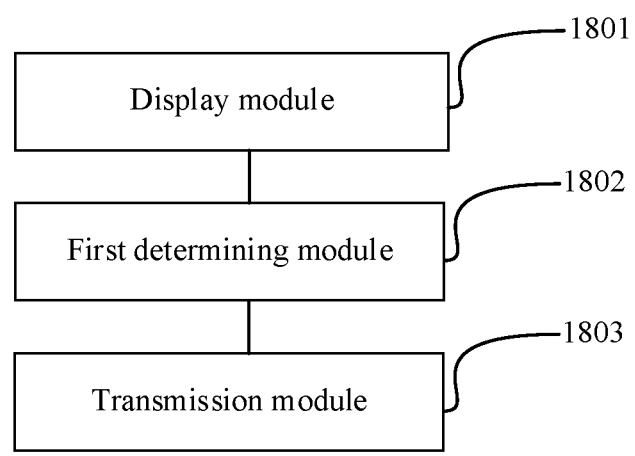
FIG. 18 is a schematic structural diagram of a data transmission apparatus according to an embodiment of the present disclosure.

FIG. 18 is a schematic structural diagram of a data transmission apparatus according to an embodiment of the present disclosure. Referring to FIG. 18, the apparatus includes:

a display module 1801, configured to display, in an acceleration function interface of a first application, a second application to be accelerated, the first application configured to reduce a network latency between the second application and a corresponding target server, and the second application configured to provide a virtual scene;

a first determining module 1802, configured to determine a target transmission link based on a network latency of a mobile communication link and a network latency of a wireless communication link in response to a trigger operation on the second application, the target transmission link including at least one of the mobile communication link and the wireless communication link; and a transmission module 1803, configured to perform data transmission with the target server corresponding to the second application based on the target transmission link.

According to the apparatus provided in this embodiment of the present disclosure, the first application provides a network acceleration function to the second application, and a target transmission link is determined according to a network latency of a mobile communication link and a network latency of a wireless communication link during acceleration, the target transmission link being a transmission link with best network quality. When data is transmitted on the target transmission link, data transmission efficiency is greatly improved. If target transmission links include two transmission links, a dual-channel transmission mechanism can be further achieved, so that a network acceleration effect is optimized.

In one embodiment, based on the apparatus composition of FIG. 18, the transmission module 1803 includes:
  an obtaining unit, configured to obtain interactive data of the second application to be transmitted;
  an encapsulation unit, configured to encapsulate the interactive data based on a target transmission protocol to obtain first data; and
  a sending unit, configured to send the first data to the target server based on the target transmission link.

In one embodiment, the sending unit is configured to:
  send the first data to an acceleration server based on the target transmission link, so that the acceleration server sends the interactive data obtained by parsing the first data to the target server.

In one embodiment, based on the apparatus composition of FIG. 18, the transmission module 1803 includes:
  a receiving unit, configured to receive second data based on the target transmission link, the second data being interactive data returned by the target server to the second application.

In one embodiment, when the target transmission link includes the wireless communication link and the mobile communication link, the receiving unit is configured to:
  when the second data is received from either communication link of the wireless communication link and the mobile communication link, retain the second data when the second data currently received is received for the first time; and discard the second data when the currently received second data is not received for the first time.

In one embodiment, the first determining module 1802 is configured to perform any of the following:
  determining the wireless communication link as the target transmission link when the network latency of the wireless communication link is lower than an expected latency;
  determining the mobile communication link as the target transmission link when the network latency of the mobile communication link is lower than the expected latency; and
  determining both the wireless communication link and the mobile communication link as the target transmission link when the network latency of the wireless communication link and the network latency of the mobile communication link are both higher than or equal to the expected latency.

In one embodiment, based on the apparatus composition of FIG. 18, the apparatus further includes:
  a first sending module, configured to send a probing message based on the wireless communication link, the probing message being used for updating the network latency;
  a receiving module, configured to receive, based on the target transmission link, an ACK message returned based on the probing message; and
  a second determining module, configured to determine a time difference between a sending moment of the probing message and a receiving moment of the ACK message as an updated network latency.

In one embodiment, based on the apparatus composition of FIG. 18, the apparatus further includes:
  a second sending module, configured to send a notification message based on the target transmission link when no interactive data is transmitted based on the target transmission link within target duration, the notification message being used for maintaining a connected state of the target transmission link.

In one embodiment, based on the apparatus composition of FIG. 18, the apparatus further includes:
  a third sending module, configured to send a channel close message based on the target transmission link in response to a stop acceleration instruction on the second application, the channel close message being used for indicating to disconnect the target transmission link; and
  a release module, configured to release communication resources occupied by the target transmission link.

In one embodiment, the display module 1801 is further configured to:
  display the acceleration function interface in response to a trigger operation on an acceleration option in a main interface of the first application; or
  display the acceleration function interface in response to a trigger operation on an acceleration option in a message notification bar of the first application.

In one embodiment, the display module 1801 is further configured to: display a timing control, the timing control being used for indicating the remaining time for jumping from the first application to the second application.

Based on the apparatus composition of FIG. 18, the apparatus further includes a jump module, configured to: jump from the first application to the second application in response to the timing control indicating that the remaining time is 0.

In one embodiment, the display module 1801 is further configured to:
  display acceleration description information during running of the second application, the acceleration description information including at least one of a speed-up effect and network stability, the speed-up effect being used for representing a difference in the network latency before and after acceleration, and the network stability being used for representing a network packet loss status of the target transmission link.

All the foregoing example technical solutions can be combined in different manners to form other embodiments of the present disclosure, and details are not described herein again.

The foregoing function modules are merely described for exemplary purposes when the data transmission apparatus provided in the foregoing embodiments performs data transmission. In actual applications, the foregoing functions may be allocated to different function modules according to needs, which means that the internal structure of the electronic device is divided into different function modules, to complete all or some of the functions described above. In addition, the data transmission apparatus provided in the foregoing embodiment is based on the same concept as the data transmission method embodiment. For an example implementation process of the apparatus, refer to the data transmission method embodiment. Details are not described herein again.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory).

Likewise, a processor (or processors and memory) can be used to implement one or more modules. Moreover, each module can be part of an overall module that includes the functionalities of the module.

Figure 19:
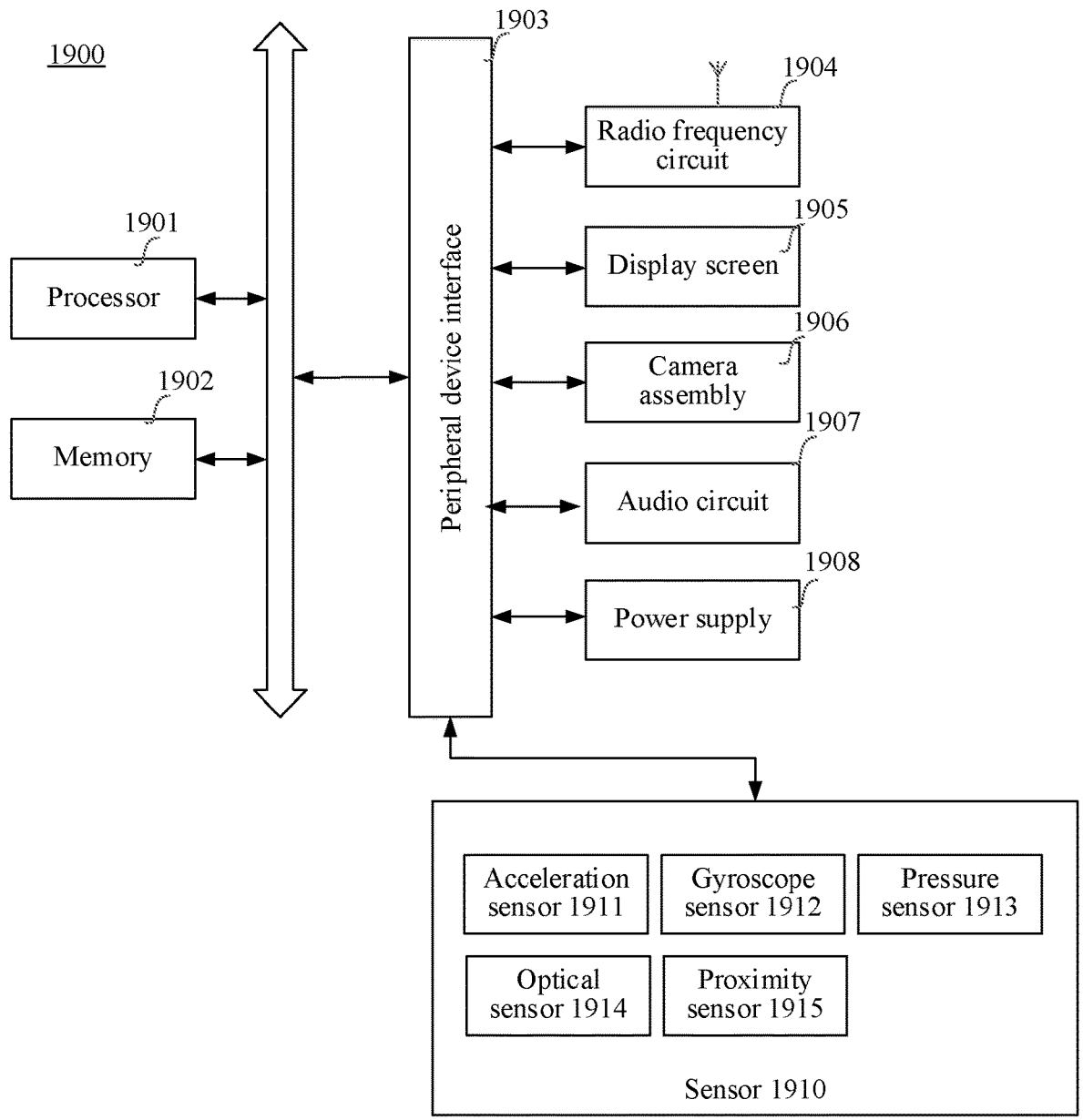
FIG. 19 is a schematic structural diagram of an electronic device according to an embodiment of the present disclosure.

FIG. 19 is a schematic structural diagram of an electronic device according to an embodiment of the present disclosure. That the electronic device is a terminal 1900 is used as an example for description. Usually, the terminal 1900 includes: a processor 1901 and a memory 1902.

In some embodiments, the processor 1901 includes one or more processing cores, for example, a 4-core processor or an 8-core processor.

In some embodiments, the memory 1902 includes one or more computer-readable storage mediums. In some embodiments, the computer-readable storage medium is non-transitory. In some embodiments, the memory 1902 further includes a high-speed random access memory and a non-volatile memory, for example, one or more disk storage devices or flash storage devices. In some embodiments, the non-transitory computer-readable storage medium in the memory 1902 is configured to store at least one piece of program code, the at least one piece of program code being configured for execution by the processor 1901 to implement the data transmission methods provided in the embodiments of the present disclosure.

In some embodiments, the terminal 1900 may further include: a peripheral device interface 1903 and at least one peripheral device. The processor 1901, the memory 1902, and the peripheral interface 1903 can be connected through a bus or a signal cable. Each peripheral can be connected to the peripheral interface 1903 through a bus, a signal cable, or a circuit board. Specifically, the peripheral device includes: at least one of a radio frequency (RF) circuit 1904, a display screen 1905, a camera assembly 1906, an audio circuit 1907, and a power supply 1908.

The peripheral interface 1903 may be configured to connect the at least one peripheral related to input/output (I/O) to the processor 1901 and the memory 1902.

The RF circuit 1904 is configured to receive and transmit an RF signal, also referred to as an electromagnetic signal. The RF circuit 1904 communicates with a communication network and other communication devices through the electromagnetic signal. The RF circuit 1904 converts an electrical signal into an electromagnetic signal for transmission, or converts a received electromagnetic signal into an electrical signal. In some embodiments, the RF circuit 1904 communicates with another terminal by using at least one wireless communication protocol. The wireless communication protocol includes, but is not limited to: a metropolitan area network, generations of mobile communication networks (2G, 3G, 4G, and 5G), a wireless local area network, and/or a wireless fidelity (Wi-Fi) network.

The display screen 1905 is configured to display a user interface (UI). When the display screen 1905 is a touch display screen, the display screen 1905 further has a capability of acquiring a touch signal on or above a surface of the display screen 1905. The touch signal can be input to the processor 1901 as a control signal for processing.

The camera assembly 1906 is configured to capture images or videos. In some embodiments, the camera assembly 1906 includes a front-facing camera and a rear-facing camera.

In some embodiments, the audio circuit 1907 includes a microphone and a speaker. The microphone is configured to acquire sound waves of a user and an environment, and convert the sound waves into an electrical signal to input to the processor 1901 for processing, or input to the RF circuit 1904 for implementing voice communication.

The power supply 1908 is configured to supply power to components in the terminal 1900. In some embodiments, the power supply 1908 is an alternating current, a direct current, a primary battery, or a rechargeable battery. When the power supply 1908 includes a rechargeable battery, the rechargeable battery supports wired charging or wireless charging. The rechargeable battery is further configured to support a fast charging technology.

In some embodiments, the terminal 1900 further includes one or more sensors 1910. The one or more sensors 1910 include, but are not limited to: an acceleration sensor 1911, a gyroscope sensor 1912, a pressure sensor 1913, an optical sensor 1914, and a proximity sensor 1915.

In some embodiments, the acceleration sensor 1911 detects a magnitude of acceleration on three coordinate axes of a coordinate system established with the terminal 1900. For example, the acceleration sensor 1911 is configured to detect components of gravity acceleration on the three coordinate axes. The acceleration sensor 1911 is further configured to acquire motion data of a game or a user.

In some embodiments, the gyroscope sensor 1912 detects a body direction and a rotation angle of the terminal 1900. The gyroscope sensor 1912 cooperates with the acceleration sensor 1911 to acquire a 3D action by the user on the terminal 1900. The processor 1901 implements the following functions according to the data acquired by the gyroscope sensor 1912: motion sensing (such as changing the UI according to a tilt operation of the user), image stabilization at shooting, game control, and inertial navigation.

In some embodiments, the pressure sensor 1913 is arranged at a side frame of the terminal 1900 and/or a lower layer of the display screen 1905. When the pressure sensor 1913 is arranged at the side frame of the terminal 1900, a holding signal of the user on the terminal 1900 can be detected. The processor 1901 performs left and right hand recognition or a quick operation according to the holding signal acquired by the pressure sensor 1913.

The optical sensor 1914 is configured to acquire ambient light intensity. In an embodiment, the processor 1901 controls display brightness of the display screen 1905 according to the ambient light intensity acquired by the optical sensor 1914.

The proximity sensor 1915, also referred to as a distance sensor, is generally disposed on the front panel of the terminal 1900. The proximity sensor 1915 is configured to collect a distance between the user and the front surface of the terminal 1900.

A person skilled in the art can understand that the structure shown in FIG. 19 constitutes no limitation on the terminal 1900, and the terminal can include more or fewer components than those shown in the figure, or some components can be combined, or a different component deployment can be used.

Figure 20:
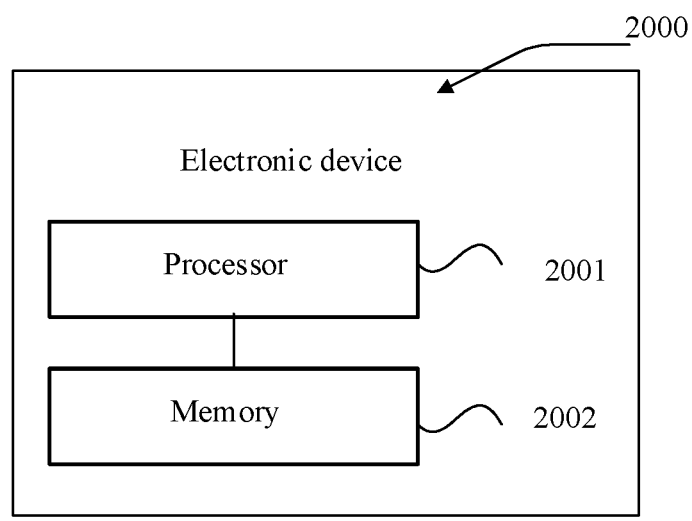
FIG. 20 is a schematic structural diagram of an electronic device according to an embodiment of the present disclosure.

FIG. 20 is a schematic structural diagram of an electronic device according to an embodiment of the present disclosure. The electronic device 2000 may vary greatly due to different configurations or performance. The electronic device 2000 includes one or more processors (central processing units (CPUs)) 2001 and one or more memories 2002. The memory 2002 stores at least one computer program, the at least one computer program being loaded and executed by the one or more processors 2001 to implement the data transmission methods provided in the foregoing embodiments. In some embodiments, the electronic device 2000 further includes components such as a wired or wireless network interface, a keyboard, and an I/O interface, to facilitate input and output. The electronic device 2000 further includes another component configured to implement a function of a device. Details are not further described herein.

In an exemplary embodiment, a computer-readable storage medium, for example, a memory including at least one computer program, is further provided. The at least one computer program may be executed by a processor in a terminal to complete the data transmission methods in the foregoing embodiments. For example, the computer-readable storage medium includes a read-only memory (ROM), a random access memory (RAM), a compact disc read-only memory (CD-ROM), a magnetic tape, a floppy disk, an optical data storage device, and the like.

In an exemplary embodiment, a computer program product or a computer program is further provided, including one or more pieces of program code, the one or more pieces of program code being stored in a computer-readable storage medium. One or more processors of an electronic device can read the one or more pieces of program code from the computer-readable storage medium, and the one or more processors execute the one or more pieces of program code, so that the electronic device can complete the data transmission methods in the foregoing embodiments.

A person of ordinary skill in the art can understand that all or some of the steps of the foregoing embodiments can be completed by hardware, or by a program instructing relevant hardware. In some embodiments, the program is stored in a computer-readable storage medium. In some embodiments, the storage medium mentioned above is a ROM, a magnetic disk, an optical disc, or the like.

The foregoing descriptions are merely example embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A data transmission method, performed by an electronic device, the method comprising:
    displaying, in an acceleration function interface of a first application, a second application to be accelerated, the first application configured to reduce a network latency between the second application and a corresponding target server, and the second application configured to provide a virtual scene;
    determining a target transmission link based on a network latency of a mobile communication link and a network latency of a wireless communication link in response to a trigger operation on the second application, the target transmission link comprising at least one of the mobile communication link or the wireless communication link, comprising:
        in response to that the network latency of the wireless communication link and the network latency of the mobile communication link are both higher than or equal to an expected latency, determining both the wireless communication link and the mobile communication link as the target transmission link; and
    performing data transmission with the target server corresponding to the second application based on the target transmission link.

2. The method according to claim 1, wherein the performing data transmission with the target server corresponding to the second application based on the target transmission link comprises:
    obtaining interactive data of the second application to be transmitted;
    encapsulating the interactive data based on a target transmission protocol to obtain first data; and
    transmitting the first data to the target server based on the target transmission link.

3. The method according to claim 2, wherein the transmitting the first data to the target server based on the target transmission link comprises:
    transmitting the first data to an acceleration server based on the target transmission link, so that the acceleration server transmits the interactive data obtained by parsing the first data to the target server.

4. The method according to claim 1, wherein the performing data transmission with the target server corresponding to the second application based on the target transmission link comprises:
    receiving second data based on the target transmission link, the second data being interactive data returned by the target server to the second application.

5. The method according to claim 4, wherein when the target transmission link comprises the wireless communication link and the mobile communication link, the receiving second data based on the target transmission link comprises:
    when the second data is received from either communication link of the wireless communication link and the mobile communication link: retaining the second data when the second data currently received is received for the first time; and discarding the second data when the currently received second data is not received for the first time.

6. The method according to claim 1, wherein the determining the target transmission link based on the network latency of a mobile communication link and the network latency of a wireless communication link further comprises:
    determining the wireless communication link as the target transmission link when the network latency of the wireless communication link is lower than an expected latency; and
    determining the mobile communication link as the target transmission link when the network latency of the mobile communication link is lower than the expected latency.

7. The method according to claim 1, wherein the method further comprises:
    transmitting a probing message based on the wireless communication link, the probing message being used for updating the network latency;
    receiving, based on the target transmission link, an acknowledgement (ACK) message returned based on the probing message; and
    determining a time difference between a sending moment of the probing message and a receiving moment of the ACK message as an updated network latency.

8. The method according to claim 1, wherein the method further comprises:
    transmitting a notification message based on the target transmission link when no interactive data is transmitted based on the target transmission link within target duration, the notification message being used for maintaining a connected state of the target transmission link.

9. The method according to claim 1, wherein the method further comprises:
    transmitting a channel close message based on the target transmission link in response to a stop acceleration instruction on the second application, the channel close message being used for indicating to disconnect the target transmission link; and releasing communication resources occupied by the target transmission link.

10. The method according to claim 1, wherein the method further comprises:

displaying the acceleration function interface in response to a trigger operation on an acceleration option in a main interface of the first application; or displaying the acceleration function interface in response to a trigger operation on an acceleration option in a message notification bar of the first application.

11. The method according to claim 1, wherein the method further comprises:

displaying a timing control, the timing control being used for indicating a remaining time for jumping from the first application to the second application; and jumping from the first application to the second application in response to the timing control indicating that the remaining time is 0.

12. The method according to claim 11, wherein the method further comprises:

displaying acceleration description information during running of the second application, the acceleration description information comprising at least one of a speed-up effect or network stability, the speed-up effect representing a difference in the network latency before and after acceleration, and the network stability representing a network packet loss status of the target transmission link.

13. A data transmission apparatus, the apparatus comprising: comprising one or more processors and one or more memories, the one or more memories storing at least one computer program, and the at least one computer program being loaded and executed by the one or more processors to perform:

displaying, in an acceleration function interface of a first application, a second application to be accelerated, the first application configured to reduce a network latency between the second application and a corresponding target server, and the second application configured to provide a virtual scene;

determining a target transmission link based on a network latency of a mobile communication link and a network latency of a wireless communication link in response to a trigger operation on the second application, the target transmission link comprising at least one of the mobile communication link or the wireless communication link, comprising:

in response to that the network latency of the wireless communication link and the network latency of the mobile communication link are both higher than or equal to an expected latency, determining both the wireless communication link and the mobile communication link as the target transmission link; and performing data transmission with the target server corresponding to the second application based on the target transmission link.

14. The apparatus according to claim 13, wherein the performing data transmission with the target server corresponding to the second application based on the target transmission link comprises:

obtaining interactive data of the second application to be transmitted;

encapsulating the interactive data based on a target transmission protocol to obtain first data; and transmitting the first data to the target server based on the target transmission link.

15. The apparatus according to claim 14, wherein the transmitting the first data to the target server based on the target transmission link comprises:

transmitting the first data to an acceleration server based on the target transmission link, so that the acceleration server transmits the interactive data obtained by parsing the first data to the target server.

16. The apparatus according to claim 14, wherein the determining the target transmission link based on the network latency of a mobile communication link and the network latency of a wireless communication link further comprises:

determining the wireless communication link as the target transmission link when the network latency of the wireless communication link is lower than an expected latency; and determining the mobile communication link as the target transmission link when the network latency of the mobile communication link is lower than the expected latency.

17. The apparatus according to claim 13, wherein the performing data transmission with the target server corresponding to the second application based on the target transmission link comprises:

receiving second data based on the target transmission link, the second data being interactive data returned by the target server to the second application.

18. The apparatus according to claim 17, wherein when the target transmission link comprises the wireless communication link and the mobile communication link, the receiving second data based on the target transmission link comprises:

when the second data is received from either communication link of the wireless communication link and the mobile communication link: retaining the second data when the second data currently received is received for the first time; and discarding the second data when the currently received second data is not received for the first time.

19. The apparatus according to claim 13, wherein the one or more processors are further configured to perform:

transmitting a probing message based on the wireless communication link, the probing message being used for updating the network latency;

receiving, based on the target transmission link, an acknowledgement (ACK) message returned based on the probing message; and determining a time difference between a sending moment of the probing message and a receiving moment of the ACK message as an updated network latency.

20. A non-transitory storage medium, storing at least one computer program, the at least one computer program being loaded and executed by a processor to perform:

displaying, in an acceleration function interface of a first application, a second application to be accelerated, the first application configured to reduce a network latency between the second application and a corresponding target server, and the second application configured to provide a virtual scene;

determining a target transmission link based on a network latency of a mobile communication link and a network latency of a wireless communication link in response to a trigger operation on the second application, the target transmission link comprising at least one of the mobile communication link or the wireless communication link, comprising:
   in response to that the network latency of the wireless communication link and the network latency of the mobile communication link are both higher than or equal to an expected latency, determining both the wireless communication link and the mobile communication link as the target transmission link; and
performing data transmission with the target server corresponding to the second application based on the target transmission link.

\* \* \* \* \*